(12) United States Patent
Rosenfeld et al.

(10) Patent No.: US 11,010,811 B2
(45) Date of Patent: May 18, 2021

(54) ONLINE MARKETPLACE METHOD

(71) Applicant: Jane Technologies, Inc., Santa Cruz, CA (US)

(72) Inventors: Socrates Munaf Rosenfeld, Santa Cruz, CA (US); Abraham Munaf Rosenfeld, Capitola, CA (US); Benjamin Aaron Green, Newton, MA (US); Howard Hong, San Francisco, CA (US); Simon James Roddy, Marina Del Rey, CA (US)

(73) Assignee: Jane Technologies, Inc., Santa Cruz, CA (US)

( * ) Notice: Subject to any disclaimer, the term of this patent is extended or adjusted under 35 U.S.C. 154(b) by 0 days.

(21) Appl. No.: 16/589,363

(22) Filed: Oct. 1, 2019

(65) Prior Publication Data

US 2021/0097593 A1 Apr. 1, 2021

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0629* (2013.01); *G06Q 30/0206* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 6,868,396 B2 * | 3/2005 | Smith | G06Q 10/087 705/26.9 |
| 2003/0154135 A1 * | 8/2003 | Covington | G06Q 30/00 705/26.8 |
| 2012/0265612 A1 * | 10/2012 | Moeggenberg | G06Q 30/02 705/14.51 |
| 2015/0100433 A1 * | 4/2015 | Choy | G06Q 30/0269 705/14.69 |
| 2016/0063611 A1 * | 3/2016 | Davis | G06F 16/532 705/26.63 |
| 2018/0285911 A1 * | 10/2018 | Li | G06Q 30/0635 |
| 2018/0341388 A1 * | 11/2018 | Zheng | G06F 16/252 |
| 2019/0005575 A1 * | 1/2019 | Zeldin | G06Q 30/08 |
| 2019/0392503 A1 * | 12/2019 | Corrieri | G06Q 30/0629 |

OTHER PUBLICATIONS

Aspray, William, Discovering a Role Online: Brick-and-Mortar Retailers and the Internet, Jan. 1, 2008, MIT Press 2008 (Year: 2008).*

(Continued)

*Primary Examiner* — Jeffrey A. Smith
*Assistant Examiner* — Timothy J Kang
(74) *Attorney, Agent, or Firm* — Fish & Richardson P.C.

(57) ABSTRACT

Among other things, information is received, from two or more competitor merchants offering products to customers, about one or both of a current price and units of inventory of each of the products. The information about the current prices and units of inventory of the product offered by the two or more competitor merchants is provided through a communication network for presentation to one or more customers.

28 Claims, 40 Drawing Sheets

(56) References Cited

OTHER PUBLICATIONS

Figure 1:
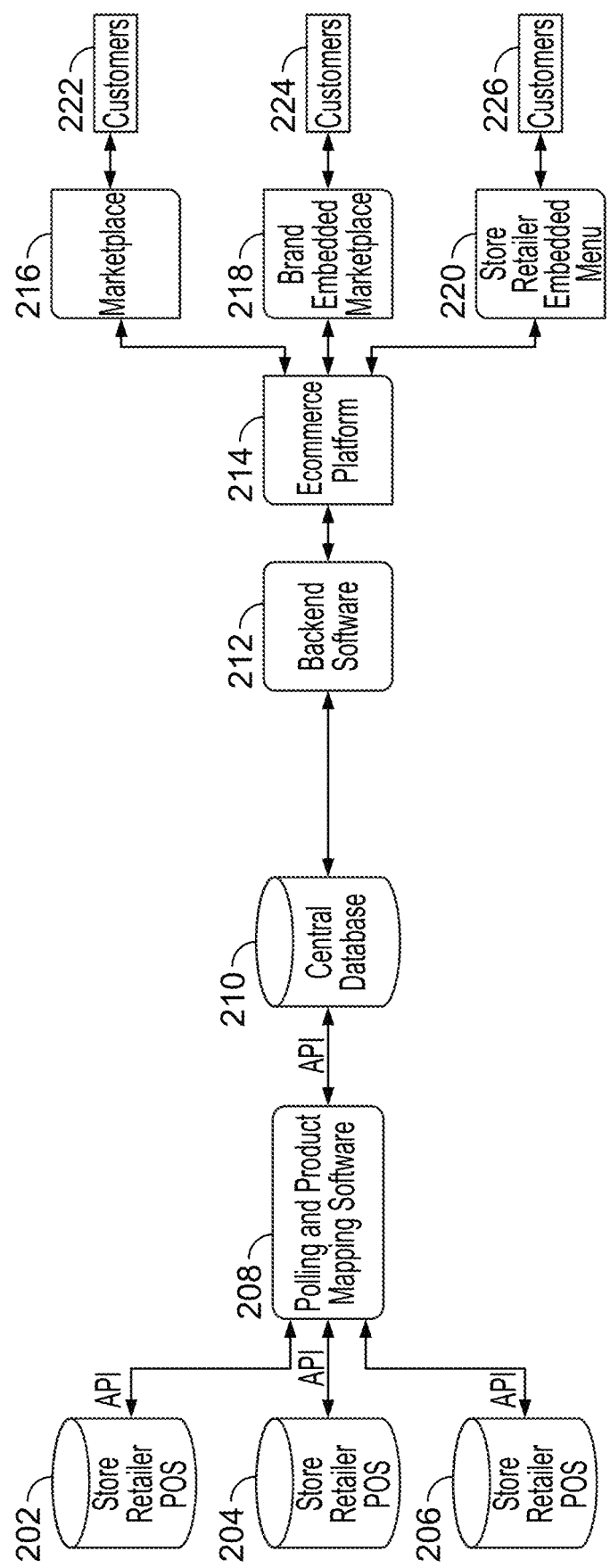

BikeBug.com [online], "Bike Bug", May 21, 2019, [retrieved on Sep. 26, 2019], retrieved from: URL<https://www.bikebug.com/>, 2 pages.
Eaze.com [online], "Discover the best in cannabis", Aug. 31, 2019, [retrieved on Sep. 26, 2019], retrieved from: URL<https://www.eaze.com/>, 12 pages.
Grailed.com [online], "Latest From Grailed Official", Aug. 7, 2019, [retrieved on Sep. 26, 2019], retrieved from: URL<https://www.grailed.com/>, 5 pages.
IHeartJane.com [online], "10:1 Chocolate Chip [10pk] (100 mg CBD/10mg THC)", Published on or before Sep. 26, 2019, [retrieved on Sep. 26, 2019], retrieved from: URL<https://www.iheartjane.com/products/108396/big-pete-s-treats-10-1-chocolate-chip-10pk-100mg-cbd-10mg-thc>, 2 pages.
IHeartJane.com [online], "Search live menus. Order cannabis online.", Jul. 6, 2019, [retrieved on Sep. 26, 2019], retrieved from: URL<https://www.iheartjane.com/>, 6 pages.
LaCroixWater.com [online], "Where to buy", Published on or before Sep. 26, 2019, [retrieved on Sep. 26, 2019], retrieved from: URL<https://www.lacroixwater.com/store-locator/>, 5 pages.
Net-A-Porter.com [online], "Net-A-Porter", Sep. 18, 2019, [retrieved on Sep. 26, 2019], retrieved from: URL<https://www.net-a-porter.com/us/en/>, 3 pages.
Nike.com [online], "Find a Nike Store", Published on or before Sep. 26, 2019, [retrieved on Sep. 26, 2019], retrieved from: URL<https://www.nike.com/us/retail/?page=1&storesPerPage=15>, 3 pages.
Sunderstorm.com [online], "Where to buy", Published on or before Sep. 26, 2019, [retrieved on Sep. 26, 2019], retrieved from: URL<https://sunderstorm.com/where-to-buy/>, 2 pages.
Weedmaps.com [online], "Brands | Discover. Learn. Explore.", Published on or before Sep. 26, 2019, [retrieved on Sep. 26, 2019], retrieved from: URL<https://weedmaps.com/brands>, 5 pages.

\* cited by examiner

FIG. 6

FIG. 9

Brady's Buds

▼ Brady's Buds Menu    Home    Our Menu    Contact Us    Account

— 1202

TINCTURE | CBD
CBD (100mg)
Larry's Treat
Tincture
DETAILS
100mg CBD
DESCRIPTION
Helps dogs maintain a calm energy. Easy-to-use with dog-approved taste. Formulated with CBD and other naturally-occuring cannabiniods from hemp, flavinoids and a comprehensive vitamin blend. Enhanced with L-Theanine to increase alpha wave generation and lower anxiety
SHARE $150.00
Includes tax
Added To 🛒

QTY  ⊖ 2 ⊕

Because you're viewing CBD Pets by Larry's Treats

— 1204

82% MATCH
CBD
CBD Beef [10pk] (100mg)
Larry's Treats
SOFT CHEWS
EACH
$30.00

78% MATCH
CBD
CBD Chicken [10pk] (100mg)
Larry's Treats
BISCUITS
EACH
$30.00

77% MATCH
CBD
CBD (100mg)
Larry's Treats
TOPICAL
EACH
$50.00

75% MATCH
CBD
CBD Vegetables [10pk] (100...
Larry's Treats
BISCUITS
EACH
$35.00

[Products] [Stores]     🛒 [Account]

◂ Products

[Tincture] [CBD]

CBD (100mg)
Larry's Treats
Tincture

DETAILS
100mg CBD

DESCRIPTION
Helps dogs maintain a calm energy. Easy-to-use with dog-appored taste. Formulated with CBD and other naturally-occuring cannabiniods from hemp, flavinoids and a comprehensive vitamin blend. Enhanced with L-Theanine to increase alpha wave generation and lower anxiety

SHARE
ⓕ ⓥ ⓞ

QTY
⊖ 1 ⊕

---

3 stores near you:
Change location              [Cheapest price ▾]

[♡MED] [RESPONDS 10-30 MINS]
Brady's Buds
Pickup 12:00 am - 11:59 pm
☆ 5.0 (651 reviews)

5 MI $75.00
includes tax
Add to 🛒

[♡REC] [RESPONDS 0-10 MINS]
Debbie's Dankery
Pickup 12:00 am - 11:45 pm
Delivery 12:00 am - 11:45 pm
☆ 4.8 (150 reviews)

1 MI $78.00
taxes may apply
Add to 🛒

[♡REC] [RESPONDS 0-10 MINS]
Christy's Chronic
Pickup 12:00 am - 11:00 pm
Delivery 12:00 am - 11:00 pm
☆ 5.0 (396 reviews)

1.2 MI $80.00
includes tax
Add to 🛒

ONLINE MARKETPLACE METHOD

BACKGROUND

This description relates to online marketplaces.

Typical brand-based businesses, for example, build and maintain interest, demand, and loyalty of customers largely by providing desirable products at competitive prices and encouraging the customers to associate the products with carefully selected, protected, and promoted names and other marks. Although they sometimes may not sell their products to end-use customers directly, brand-based businesses (brands) frequently promote their products directly to such end-use customers using advertisements and promotions.

A typical brand also hosts an online site such as a website or a mobile app where its customers can learn about the brand and its products and can identify merchants that have a physical presence (such as a brick and mortar store) or an online presence (though an online site), or both, where the products of the brand are available for customers to buy. The brand's online site may show the address, phone number, and hours of operation of each physical presence and a URL or other link or network address of each online presence. To buy a product of the brand, the customer then can link to an online site of the merchant and engage in a purchase transaction (e.g., a checkout process or a card transaction). To compare prices of a particular product offered by different merchants or determine whether the product is available at a particular merchant, the customer may need to travel to more than one physical merchant or link to more than one online site of the merchants.

Comparative prices offered by competitor merchants for a given branded product are sometimes available to a customer through independent online sites that aggregate the comparative price information from publicly available online sources or from direct price feeds arranged with online retailers.

On a site hosted by Jane Technologies, at https://www.i-heartjane.com/products/108396/big-pete-s-treats-10-1-chocolate-chip-10pk-100mg-cbd-10mg-thc, a customer for cannabis products can see a gallery of merchants having physical presence where a given branded product is available for sale, the prices for the product at those merchants, and the locations and hours of operation of those merchants. In some cases, the availability of a given branded product at a given merchant is based on real-time inventory data obtained through a communication network from the merchant. Using the information available on the Jane site, the customer can travel to one of the merchants to acquire the product at a favorable price without having to do any other investigation or traveling.

Brands are interested in acquiring and studying detailed data about purchases of their products, including who the customers are who buy their products, which products the customers buy and in what quantities, which merchants sold the products to the customers at which locations, when the customers bought the products, why and in what context the customers bought the products, and how the customers bought the products, among other things. Merchants who make sales to customers through online sites often can obtain, store, and analyze most or all of these kinds of information, although they may not be willing to share the information with brands. Brands making sales through their own online sites can obtain, store, and analyze the information for those sales, but the sales may be relatively limited in proportion to all sales of a product. Available market data about sales of a brand's products at physical retail stores tends to be much more limited. Such data acquired by market research firms may only indicate which product was purchased, where, and when, and not who bought it, why and in what context, or how.

SUMMARY

In general, in an aspect, information is received, from two or more competitor merchants offering products to customers, about one or both of a current price and units of inventory of each of the products. The information about the current prices and units of inventory of the product offered by the two or more competitor merchants is provided through a communication network for presentation to one or more customers.

Implementations may include one or a combination of two or more of the following features. The received information about one or both of the current price and units of inventory of each of the products is stored in a central database, and the information for presentation to the customer is provided using the information stored in the central database. The information is provided through a communication network to a server of an online site controlled independently from the central server. The online site includes a site of a brand or of another product portal. The online site includes a site of a merchant. The providing of the information for presentation to the one or more customers includes providing data representing an online marketplace. The providing of the information for presentation to the one or more customers includes providing the information in real time as the current prices or units of inventory of the merchants change. The receiving of the information of one or both of the current price and units of inventory of each of the products includes receiving the information from computer processes running at or in association with point-of-sale systems of the one or more competitor merchants. In conjunction with the presentation of the information about a current price or units of inventory, user interface elements are presented for the customer to engage in a purchase transaction with one of the merchants. At least one of the merchants has a physical presence, the purchase transaction is for a unit of the product available at a location of the physical presence, and the unit of the product is to be picked up by or delivered to the customer from the location. An identification of a product determined to be of interest to one of the customers his received in the information provided for presentation to the customer is filtered based on the identification of the product.

In general, in an aspect, an identification is received of a product (a) determined to be of interest to a customer using an online site of a brand or other product portal, and (b) known to be available from a merchant controlled independently of the brand or other product portal. User interface elements are presented on the online site being used by the customer for the customer to engage in a purchase transaction with the merchant at which the product is known to be available.

Implementations may include one or a combination of two or more of the following features. Features of a purchase transaction facility of the merchant are exposed to the customer. A central server acts as an intermediary for the purchase transaction between the customer and the merchant. The central server provides information resulting from the purchase transaction to the merchant for use in fulfillment of the purchase transaction. The merchant has a physical presence at a location and the central server provides the information for use in fulfillment of the purchase transaction from the location of the physical presence of the merchant. The central server receives information about customer activities on the online site including activities during the purchase transaction and other activities prior to or after the purchase transaction. The central server stores the information about customer activities and sends the stored information to the brand or other product portal. The central server causes confirmation of the purchase transaction to be provided to the customer.

In general, in an aspect, information is received about activities of a customer on an online site of a brand, including activities with respect to an identified product of the brand. The central server is controlled independently of the brand. The information about the activities of the customer his correlated with information about units of the identified product of the brand available at one or more merchants controlled independently of the brand.

Implementations may include one or a combination of two or more of the following features. The information about activities of the customer includes information about customer navigation of the online site. The information about activities of the customer includes information about customer input to the online site. The information about activities of the customer includes information about the identified product. The information about activities of the customer includes information about a purchase transaction by the customer for the product at one of the merchants. The information about activities of the customer includes information representing at least one of an identity of the customer, reasons for the purchase transaction, a context of the purchase transaction, or a method in which the purchase transaction was effected. The received information about activities of the customer on the online site of the brand is sent to the brand. The information about activities of the customer on the online site of the brand is sent to one or more of the merchants controlled independently of the brand. Information is received about purchase transactions at one or more of the merchants having physical presences at locations, the purchase transactions having been fulfilled from the locations.

In general, in an aspect, information is received about a context of a purchase transaction made through an online site of a brand, of an identified product from a merchant controlled independently of the brand. The information about the context includes at least one of an identity of a customer who engaged in the purchase transaction, a reason for the purchase transaction, a context of the purchase transaction, or a method in which the purchase transaction was effected.

Implementations may include one or a combination of two or more of the following features. Information is received about the purchase transaction including at least one of the identified product of the brand, the merchant from which the purchase was made, and a time when the purchase was made. The information about the purchase transaction is matched with the corresponding information about the context of the purchase transaction to produce composite information including at least some of the information about the purchase transaction and at least some of the information about the context of the purchase transaction. The composite information is sent over a communication network from a central server for use in market analysis. The central server enables the purchase transaction to be made through the online site of the brand. Notice is provided to the merchant of the purchase transaction and information his received from the merchant of fulfillment of the purchase transaction from a location of a physical presence of the merchant.

In general, in an aspect, current information is received representing units of inventory of one or more identified products available at two or more competitor merchants and corresponding prices of the products. A database is updated based on the received information. A body of information is aggregated from the database representing a marketplace for units of one or more identified products. The units of a given product our available at two or more of the competitor merchants at different prices. From the central server, a body of information is sent for presentation as an online marketplace on a site. The online marketplace or the site also enables a customer to engage in a purchase transaction for any of the units of the product from any of the two or more competitor merchants without leaving the site.

Implementations may include one or a combination of two or more of the following features. At least one of the competitor merchants maintains a physical presence at a location. Information is included in the database about the purchase transaction. Information is included in the database about activities of the customer at the site other than engagement in the purchase transaction. The one or more products are selected based on relationships of products to one or more brands. The one or more products are selected based on relationships of products to activities of the customer on the site. The one or more products are selected based on catalogs of products of one or more of the competing merchants. Data is sent from which the online marketplace can be presented in association with existing user interface elements of the site. The body of information is sent to a site of one or more of the competitor merchants. A widget is sent to be embedded in a site. The widget includes user interface elements enabling a user to navigate, sort, filter, and view available units of the given product at the two or more competitor merchants, and corresponding prices.

These and other aspects, features, implementations, and advantages (a) can be expressed as methods, apparatus, systems, components, program products, business methods, means or steps for performing functions, and in other ways, and (b) will become apparent from the following description and from the claims.

DESCRIPTION

Figure 2:
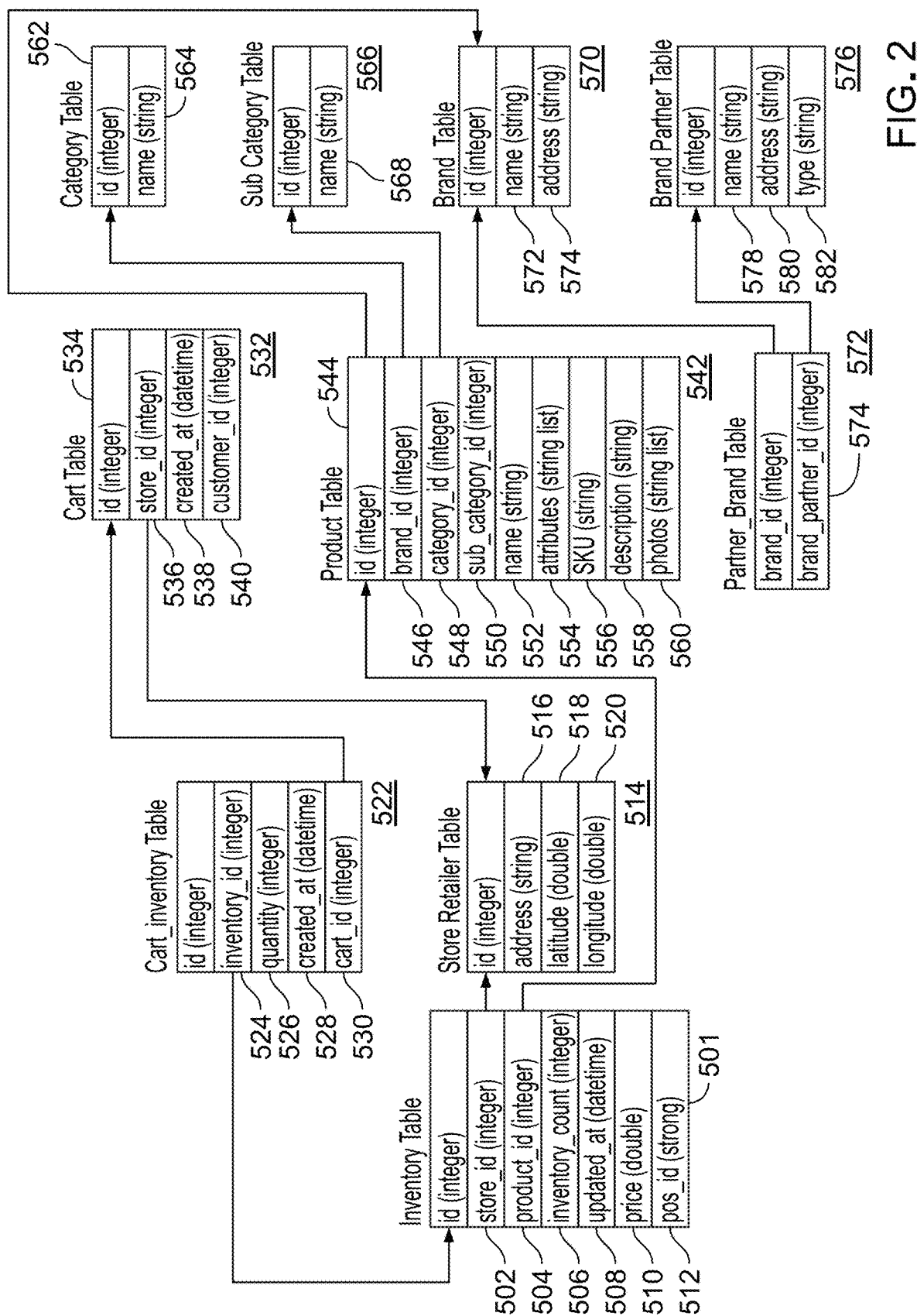
Figure 3:
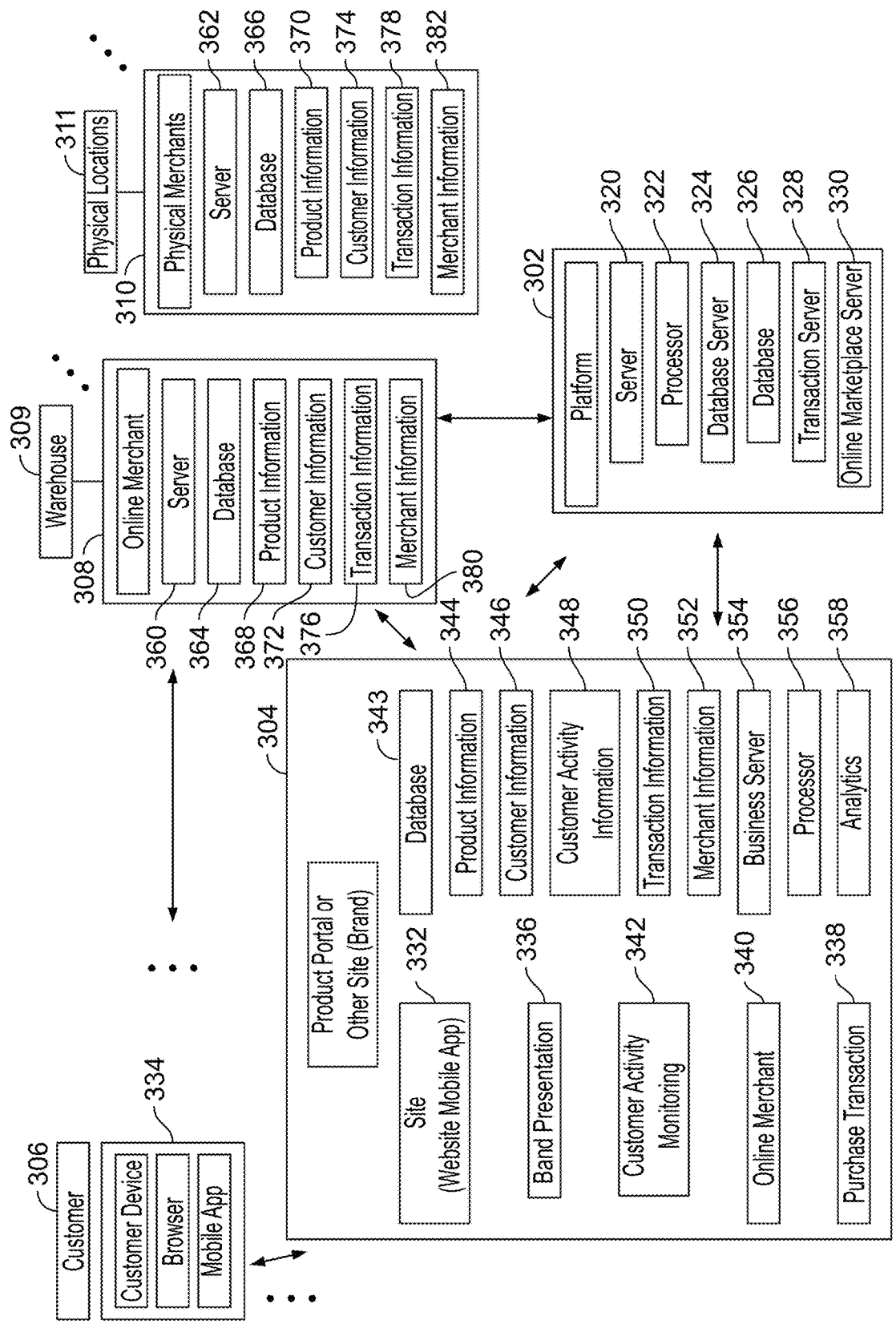
Figure 4:
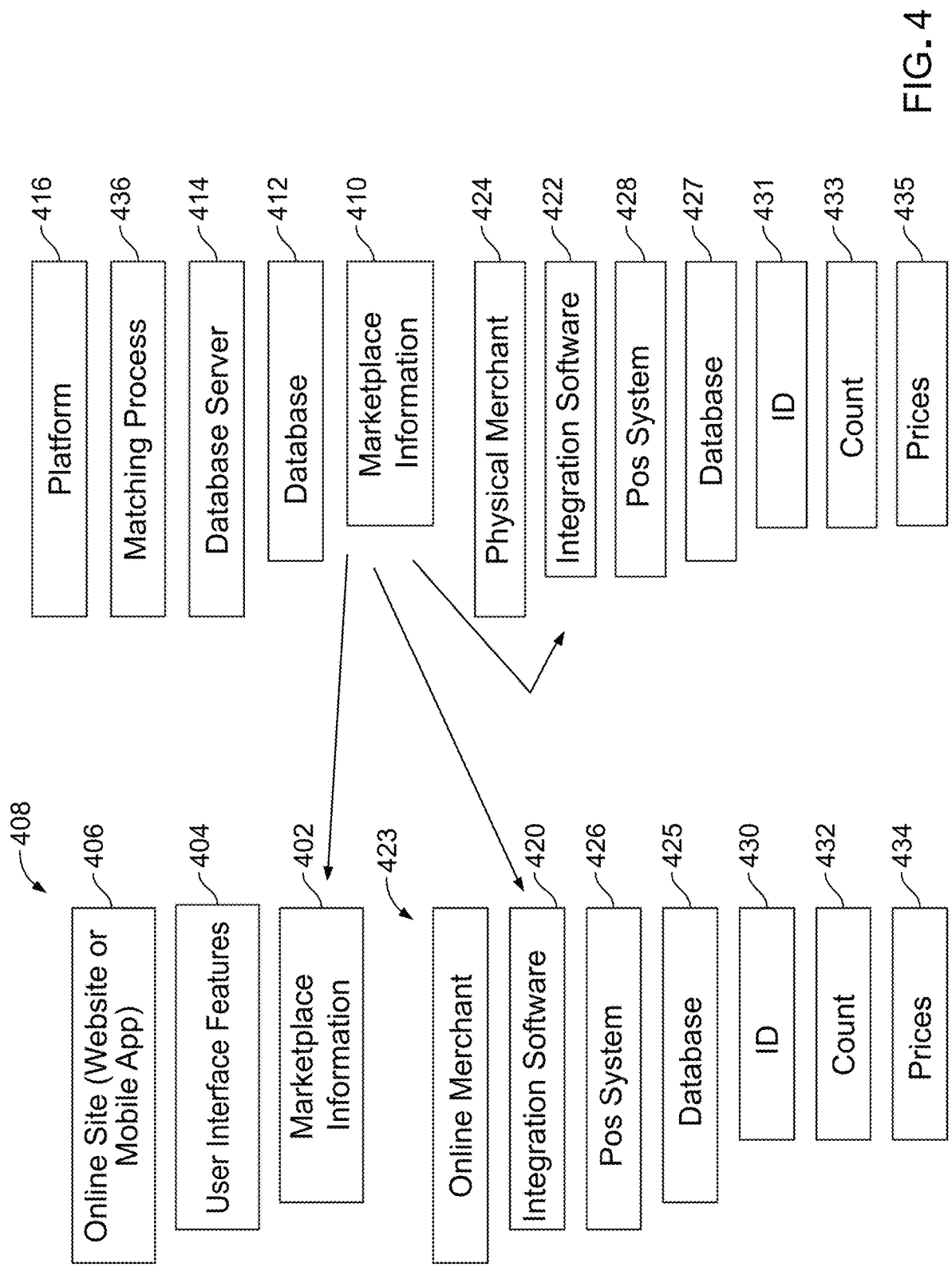

FIG. 1 is a block diagram.
FIG. 2 is a database schema.
FIG. 3 is a block diagram.
FIG. 4 is a schematic diagram,
FIGS. 5 through 41 are pages of user interfaces.

OVERVIEW

Here, among other things, we describe an online marketplace platform (which we sometimes call simply a "platform") and a corresponding platform technology (which we sometimes call simply the "technology") that enable product sources (including brands), merchants, a platform host, and others to implement one or more of the following capabilities (and others):
Presenting Marketplace Information.
Complete, accurate, current, and comparative product information and merchant information (we sometimes use the term "marketplace information" to refer to the product information and the merchant information, and other information) of competitor merchants can be presented to and navigated by customers and others by, for example, searching, sorting, and filtering using a wide variety of criteria. The marketplace information can be presented and navigated at product online sites of product sources, merchants, the platform host, and others participating in the platform technology (we sometimes refer to such parties as "platform participants").

Enabling Comparative Shopping

Customers, such as end-use customers and others (for example, distributors, wholesalers, or other intermediate customers) can, through the online sites of the product sources, online merchants, and the platform host, access, view, navigate, and otherwise interact with accurate, current, complete, and comparative product information as if the customers were engaging in those activities directly using features of existing online sites of the merchants.

Enabling Purchase Transactions

Customers can initiate and complete purchase transactions (and other financial transactions) for products available at the online sites and physical presences of the merchants directly from product portals in a similar manner to and as if the customers were initiating and completing such purchase transactions directly through the online sites of the merchants.

Capturing Customer Activity Information

Information about customer activities (customer activity information), including customer searching, filtering, sorting, viewing, navigating, entering information, and initiating and completing purchase transactions, among other things, performed at the sites of the product sources, merchants, or the host of the platform can be monitored and captured by or on behalf of one or more platform hosts of the technology. Customer activity information can be aggregated, and analyzed, and matched with marketplace information by or on behalf of one or more platform hosts. The customer activity information and the results of the aggregation and matching analysis can be provided to product portals, online merchants, physical merchants, and other parties, in some cases for a fee.

Presenting Online Marketplaces

The platform can define, generate, assemble, and distribute one or more generic or customized online marketplaces to be presented on, used by, or embedded within one or more online sites of product portals, merchants, the host of the platform, and others. An online marketplace exposes accurate, complete, competitive, and comparative marketplace information about products and merchants in real-time to customers using such online sites and enables the customers to navigate the marketplace information, compare products and prices, and conduct purchase transactions immediately and directly with any of the competitor merchants offering a product. An online marketplace therefore enables a customer to buy one or more units of a product at the best price from a merchant of interest after comparing merchant information and prices all as part of unified, integrated, continuous, and seamless customer activities that can occur on a single site in a single session.

Benefits of the Technology

Among other benefits, the technology enables brands or other product portals to facilitate sales of their products, entice customers to visit and navigate their web sites or other online sites, and acquire, study, and act on customer activity information not previously available to them.

Among other advantages for merchants, the technology enhances access by customers to information about products available from the merchants and may increase purchase transactions for those products.

In some cases, and in particular for certain kinds of products, end-use customers may wish to travel to a physical merchant to physically browse, test, try, consider, compare, or acquire one or more products, for one or more of the following reasons, for example.

The customer may want to acquire the product immediately or within a short time or to acquire it from a physical merchant that is local or nearby. In some instances, the product is one that has characteristics or qualities that can only be evaluated in person. There may be a variety of closely similar products and comparison can only be done effectively by physical examination. Some products, such as alcohol or cannabis, are regulated and can only be delivered by a merchant to a customer physically at the merchant's location. A few examples of products that have one or more of these qualities include alcoholic beverages, cosmetics, fashion clothing, and bicycle parts.

When a customer wants to travel to a physical merchant for any of these purposes, the customer often wants to know marketplace information in advance, such as which physical merchants have the product available, how many units of the product are available, the price of the product, any promotional offers applicable to the product, when the product will be available, when the physical merchants will be "open", and the physical locations of the merchants, among other things.

To enable a customer to choose a single physical merchant to which to travel for an identified product, rather than having to travel to multiple physical merchants, the technology enables comparative marketplace information for multiple merchants to be presented through online sites in one place and at one time. The presented information can then be used by the customer to compare characteristics of the product units and the physical merchants to identify a single one of the physical merchants to which to travel for the product.

Even if the customer does not intend to travel to a physical merchant, presentation of information about product units available at physical merchants together with information about product units available from online merchants enable the customer to make decisions about the merchant at which it may wish to acquire the product.

The technology, among other things, enables customers to search for and review product information, including comparative product information, and engage in purchase transactions easily and directly from a brand or other product portal's online site, or to locate and travel to a physical merchant known to have a particular product available at a known price satisfactory to the customer.

Certain Terms

We use the term "product" broadly to include, for example, any kind of good or service or other subject of commerce. Usually, products in the form of goods (such as consumer goods) are made in multiple essentially identical units identified by a common product identifier, such as a model number or name, a stock keeping unit (SKU), or a variety of other unique designators. We sometimes use the term "identified product" to refer to a product associated with such a unique designator. When two or more merchants offer units of an identified product based on such a unique designator, the units normally are understood to be essentially the same.

We typically use the term "brand" to refer to a product supplier associated with and promoting its branded products. We sometimes use the phrase "brand supplier" to refer to a product supplier of a particular brand or brands, for example, a manufacture of products of a particular brand or brands.

We typically use the term "branded product" to refer to a product that is associated by customers with a particular source or product supplier, such as a manufacturer or a company that selects, sources, or distributes a group, line, or range of products. Usually, branded products are associated by customers with a particular source or product supplier based on use, advertising, promotion, and marketing by the source of the branded products, in particular with use of a mark or name. Often, product portals (for example brand sites) do not offer branded products for sale directly to customers (or if they do so, only as a convenience to site visitors) but rather offer them indirectly through a chain of distribution that can include one or more levels of wholesalers or distributors and ultimately online merchants or physical merchants.

We use the term "customer" broadly to include, for example, any individual or entity who has an interest in or is acquiring one or more products including identified products. A customer could be an end-use customer, that is, a customer who will employ or consume a product directly, or could be a wholesaler or distributor who is acquiring products for redistribution or resale. A customer could be a private consumer or could be a commercial customer acquiring products for use in manufacturing or redistribution, for example.

We use the term "merchants" broadly to include, for example, any individual or other entity that offers products for sale to end-use or other customers. Often, a merchant offers products obtained from more than one brand supplier or other product supplier but does not itself operate as a brand. A merchant can maintain an online presence by marketing products through online sites such as web pages or mobile apps or a physical presence at one or more physical locations, such as brick-and-mortar stores, that are operated to permit customers to browse, test, try, consider, compare, or physically acquire one or more products, among other activities. A given merchant can have both a physical presence and an online presence. A merchant can provide pickup or delivery options to customers. For example, a merchant having a physical presence can deliver or permit pickup of products from its physical location to customers. We sometimes use the term "competitor merchants" to refer to two or more independent merchants having available units of a given identified product.

We use the term "product portal" broadly to include, for example, any individual or entity presenting products of two or more merchants to customers through an online presence. A product portal can be operated by a brand or by a party that is not itself a brand. A product portal can present products of two or more brands or products that are not branded, or both. Through a product portal, customers can (using presented marketplace information) learn about products and merchants that offer the products and can engage in purchase transactions for (e.g., buy) products. In some instances, a product portal presents or offers for sale products of multiple brands in a manner that emphasizes the association of particular products with respective brands. In some examples, such as distributors or wholesalers, a product portal can itself be a customer for products offered by another product portal.

We sometimes refer to types of information used and produced by the platform technology, including product information, merchant information, comparative product information, customer activity information, and marketplace information.

We use the term "product information" broadly to include, for example, unique designators, brand identifiers, identities of product suppliers, relationships among two or more products, prices, numbers of units, characteristics of products, and combinations of them, among other things. The product information can be historical, current, or prospective, or combinations of them. When product information is available for two or more merchants for an identified product or for two or more identified products or both, we sometimes refer to the product information as "comparative product information". In a broad sense, in some implementations, the technology can acquire, aggregate, analyze, store, manage, or distribute product information at any level of organization, hierarchy, or granularity, for example, for every product available from any merchant in a geographic area or in a vertical market or with respect to a group of merchants, or a combination of those.

We use the term "merchant information" broadly to include, for example, names, locations, hours of operation, size, payment methods accepted, URLs, links, or other pointers to online sites of online merchants or physical merchants, categories and product identifiers of specific products and brands of products offered, numbers of units of the products available at each of the merchants, pickup or delivery options, relationships with brands and other parties, reputation, reviews, and period of time in business, comparative information, and other product information. among others. The merchant information can be historical, current, or prospective, or combinations of them.

We typically use the term "marketplace information" to refer to product information, merchant information, customer activity information, or a combination of two or more of those.

We use the term "customer activity information" broadly to include, for example, information representing actions of customers using product portals or sites of merchants or the platform or other sites. The customer actions can include, for example, logging on, logging off, registering, providing profile information, invoking menu items and other user interface controls, searching, filtering, or sorting marketplace information and other information, steps leading to, part of, or following purchase transactions or other transactions, forwarding information through email or posts to social networking and other third-party sites, and the combinations, durations, and sequences of one or more of such customer actions. Essentially anything that a customer can do on or with respect to a product portal or site of the merchant or of the platform can be a customer action represented by customer activity information.

We use the term "purchase transaction" broadly to include, for example, steps and activities associated with a customer buying a product from a merchant or a product portal. The purchase transaction can occur at the location of a physical presence of a merchant or can occur at an online site of a product supplier or merchant or the platform. The steps and activities of a purchase transaction can include providing credit card, bank, or other payment account information, providing demographic information about the customer, and specifying one or more identified products and numbers of units of the products.

We use the term "online marketplace" or sometimes simply "marketplace" broadly, to include, for example, any facility that can, among other things, (a) present to customers product information (including products, available units, and prices) and merchant information (such as location) for one or more competitor online merchants or physical merchants, and (b) enable customers to select one or more of the merchants, one or more of the products, numbers of units of products, and prices of products, and acquire the selected products by an online financial transaction (for example, buy the product using a credit card).

Functions and Features of the Technology

Handling of Marketplace Information

Among the functions of the platform technology are to (a) accumulate and aggregate marketplace information from merchants, product sources, and other sources of information, for example, (b) store the marketplace information at central servers, (c) assemble sets of the marketplace information that are relevant to product portals or merchants or other interested parties, and (d) distribute the respective sets of the marketplace information to or on behalf of the product portals, merchants, or other interested parties for use, among other things in presentations of online marketplaces to customers of the product portals or merchants. The sets of marketplace information and analyses of them can also be distributed to product portals and merchants for use in market studies and market analysis.

For example, two or more merchants may offer respective sets of products of two or more different brands. Product information about units of inventory of those products can be accumulated from the merchants by the technology, aggregated, stored, analyzed, and distributed by the technology.

In a broad sense, the technology could accumulate, aggregate, analyze, and distribute marketplace information that covers essentially all units of every product of every brand available at all merchants having online or physical presences. In some implementations the technology may accumulate, aggregate, analyze, and distribute subsets of such product information and merchant information, such as subsets organized by brand, geographic location, product, time period, price, or other parameter, or combinations of any two or more of them.

For this purpose, for example, the technology could aggregate marketplace information in sets specifically for use by respective product portals (for example, brand websites), merchants, or on sites hosted by the platform itself. The technology can continuously and in real time update the respective sets of marketplace information to be distributed to or with respect to various product portals and merchants to reflect accurate, complete, real-time, specifically relevant marketplace information received from product portals and merchants (or other sources). In effect, for example, the technology enables a customer to search "live menus" of inventories of products of multiple independently operated product portals and merchants (or other sources).

Acquisition and Aggregation of Marketplace Information

To support the presentation to customers of marketplace information, the technology can facilitate the comprehensive and continuous acquisition of marketplace information. In some implementations, the acquisition or the facilitation of the acquisition can be done by the technology in real time continuously through the Internet from one or more product sources, merchants, or other sources.

Many merchants and product portals operate servers, applications, and databases that maintain and update one or more types of marketplace information continuously and in real time. In some cases, some of the marketplace information (for example, inventory information) may be determined and entered manually by employees of a merchant. In some instances, much of the product information and merchant information can be determined, provided, and supplied automatically, continuously, and in real time, for example, from point-of-sale (or similar or related) systems operated by the merchants and product portals.

Presentation of the Marketplace Information

The technology can present or enable the presentation of marketplace information to customers online through websites or mobile apps or other presentation facilities in a variety of ways.

In some implementations, the marketplace information can be presented by a product portal or a merchant site or a platform host using an online marketplace provided by the technology and that can stand alone on a site or can be embedded or incorporated or integrated into a product portal or merchant site that provides a more extensive experience and features to customers.

In some implementations, the marketplace information can be presented by a platform host independently of any other product portal or merchant site, directly to customers, or can be provided by the platform to product portals or merchant sites as data or add-ons or widgets embeddable on the sites, or a combination of these approaches.

The comparative marketplace information to be presented on a brand site typically would not include marketplace information associated with products of other brands, but could include marketplace information associated with products of the brand across all of the merchants that offer those products through online presences or physical presences.

Use of Marketplace Information

The product information and merchant information that the technology accumulates, aggregates, and distributes can have a wide variety of uses by a wide variety of different parties, including customers, product portals, online merchants, physical merchants, and platform hosts of the technology.

Customers

By accessing and using the marketplace information presented to and available to them through the product portals, merchant sites, or sites of the platform host, the customers are able to compare merchants, compare identified products, compare other parameters, and make quick, informed, accurate, current decisions whether to acquire a specific product, where to acquire it, when to acquire it, and how to acquire it. Among other things, in some implementations, the product information can enable customers to save money, time, and inconvenience in acquiring products. In effect, the customer can have direct access at the product portal, the site of the merchant, or the site of platform host, to an online menu of every merchant that is offering every identified product of that product portal. The online menu can include a wide range of information about the products and the merchants.

In addition, the technology enables customers to make acquisition decisions as one stage or part of a process of experiencing and interacting with other features of the brand site or other product portal or merchant site or site of the platform host. In this sense, the technology can enhance a customer experience on existing product portals and sites. For example, customers can explore features of products and information about products on a brand site that may not be available through other sources and then can acquire products by direct interaction (e.g., by a purchase transaction performed directly) at the brand site.

Product Portals

The capability offered by the technology enabling a product portal or merchant or platform host to present marketplace information to customers on its own site can enhance its visibility, attractiveness, and exposure to customers, facilitate the capture of customer activity information, and increase sales of its products, among other things.

The technology can, among other things, track and accumulate customer activity information, use it to analyze sensitivity to prices, retention of customers, product substitutes, product complements, and other correlations commonly done for purchase transactions and other customer behavior both at online sites and at physical presences of merchants. The technology can track not only which products were bought, where they were bought, and when they were bought, but also who is purchasing products, why they are purchasing the products, and in what way they are purchasing the products. Among other things, this is possible because product portals and other sites have access to information about customers and customer activities that are not otherwise available from typical data gleaned from point-of-sale and other systems operated by merchants or other market survey techniques.

Merchants

Online merchants and physical merchants can take advantage of the capabilities offered by the technology by making their product information and merchant information available completely, accurately, and in real-time to the platform servers. The merchants then can benefit from having their products, prices, and other marketplace information exposed immediately and broadly to customers using portals, merchant sites, and sites of the platform. This exposure can lead to visibility to the customers and recognition by the customers of the existence and characteristics of the merchants, their product lines, and their prices. Increases in sales can result.

To the extent that customer activity information accumulated and analyzed by the technology is made available to merchants, those merchants can learn about their customers and improve their ability to serve them. Even though a particular merchant may offer products of more than one brand, the merchant can take advantage of the capabilities of the technology without any need to categorize, differentiate, or group its marketplace information prior to feeding it to the platform technology. The categorization, differentiation, or grouping can be done by the technology and then the appropriate marketplace information distributed or exposed through the product portals, merchant sites, or other sites.

Platform Hosts

A host of a platform that offers capabilities of the technology to other parties can also have access to and benefit from the marketplace information accumulated, aggregated, supplied, and analyzed by processes running as part of the platform technology. The information accessible to the host of the platform can be unique and unavailable from any other source because of its breadth across products, brands, merchants, and other parameters, and the way it is aggregated (essentially privately between the merchants and the platform) and can be analyzed.

For example, marketplace information fed to the platform by merchants can relate to units of identified products of a brand offered by multiple independent merchants that do not normally exchange information about their inventories and prices. Because marketplace information across multiple independent merchants is available at one location in the database maintained on the platform, the marketplace information can be studied by processes running at the platform to determine, for example, the relationship of price to merchant location, the relationship of price to customer activity information, the relationship of inventory quantities to price, the relationships of prices and inventory of different products of a brand or a different brands, and a variety of other characteristics of a marketplace.

Also, because the platform technology has access to customer activity information with respect to one or more product portals, merchants, and platform sites, it is possible, for example, to analyze the relationship of customer activity information to characteristics of different brands and to marketplace information associated with the merchants for products of the respective brands, and to analyze the variety and range of customer activity across customers and groups of customers for a given brand and across brands.

The resulting analyses and derived information described above and other information can be distributed to product portals, to merchants, and to other interested third parties (for example market research organizations) on a fee basis, a subscription basis, or without charge, or combinations of them.

Purchase Transactions

Among the features facilitated by the platform technology is enabling a customer who is using a brand site to engage directly in a purchase transaction for a product. This capability is in contrast to typical systems in which a purchase transaction involving a product must be initiated or completed or both directly on the online site of the merchant.

To enable such a platform-supported feature, in some implementations the platform technology can provide a feed of continuous, real-time data (including links) usable by webpage or mobile app servers controlled by the product portal or the merchant site. The servers could embed controls and graphical elements within the native pages being served for the product portal or the merchant site in part using the real-time data. To the customer, the embedded controls and graphical elements can appear as part of the native pages. However, when the controls are invoked by the customer to enter information and perform a transaction, the information would be directed either to transaction servers of the platform that would execute the transaction at the platform or be forwarded transparently to the customer, through the platform to existing transaction servers of merchant sites, which would execute the transaction.

In some implementations, the platform technology could provide a feed of continuous, real-time HTML-based code that the site servers controlled by the product portal or merchant site or platform site could embed directly into the pages being served, without requiring any further processing.

Other modes of delivery of the information from the platform to the product portal or merchant site or platform are also possible.

In addition to purchase transactions, other kinds of transactions that could be completed in this way could include refunds, applications of promotions, returns, and others.

By associating purchase transaction controls and graphical elements directly with other features of the product portal or merchant site or platform site, activities of the customer can be monitored, supplied, analyzed, and provided to other parties. The activities could include not only the activities involved in the transaction itself, but also the context in which those activities occurred with respect to the customer's use of the online site in general. The customer activity information can be useful to the product portal, the merchants, and the platform host.

Navigation

Also among the features facilitated by the platform technology is to enable customers to navigate marketplace information presented, for example through an online marketplace served by the platform, in a variety of ways. In some cases the navigation is enabled as part of the served online marketplace from the platform. In some instances the navigation is enabled partly by existing or added features and functions of the product portal or merchant site or platform site. In some implementations, the navigation is facilitated by a cooperative combination of features and functions (e.g., through user interface controls and dialog boxes) of the existing site and the online marketplace provided from the platform.

Based on Identified Product or Merchant

In an online marketplace, the platform technology can include user interface controls enabling a customer to navigate merchants, products, and brands in a variety of modes. In some implementations, all of the products (or all of the products of a particular brand, for example) of a selected merchant (for example, an online merchant or physical merchant) can be navigated to the exclusion of other merchants or other brands. In some examples, all of the products of a brand can be navigated to the exclusion of products of other brands. In some cases, other characteristics, parameters, or criteria can be used as filters to enable a customer to select a mode for navigating the online marketplace. Navigation can also include sorting and organizing marketplace information included in the online marketplace.

For example, if the customer chooses to navigate based on the identity of the merchant, for instance, to see all products (or all products of a particular brand) offered only by an identified merchant, the customer can be presented with a list of all merchants that are currently carrying the respective branded products (and the total number of units of the branded products currently available). Once the customer selects a merchant through the platform technology embedded on the brand site, for example, she can add multiple branded products (and products of no other brand) to her cart, reserve a pickup or delivery time, and then proceed with checkout by engaging in a purchase transaction. In performing these activities, the customer never leaves the brand's site.

If the customer chooses instead to shop (navigate) by product at the online marketplace presented on a brand's online site, the customer can search or filter (for example, using other features or functions of the site) information presented by the brand about its products to identify a particular product of interest. An identification of the selected product then can be sent to the platform technology or used at the brand's online site to fetch current, accurate, complete, and comparative marketplace information (for example from the database maintained at the platform) and present the information through the interface of the online marketplace. The customer then can learn more about the product and the merchants (such as merchants having physical presences) and where the identified product is available, can sort and filter based on prices at respective merchants, can read reviews of other verified customers, and then can proceed to buy the product from a selected merchant (that is, can engage in the checkout process or a purchase transaction) as explain earlier. The customer can engage in all of these customer activities without leaving the online site (for example, the brand's website). Once the customer has paid, the merchant will receive a notification from the platform server with all applicable order information and can fulfill the product order. Every step in the fulfillment process is automatically communicated to the customer as real-time updates for the order.

On a Platform Site

In some implementations, a user interface of an online marketplace can be presented and hosted directly by servers of the platform rather than indirectly through product portals, or online sites of merchants. In the context of such a platform site, customers can, as described above, navigate (shop) by merchant or by product or based on other criteria. If the customer chooses to navigate by merchant, the navigation can encompass all merchants that are participants in the platform technology (we sometimes call them "platform participants"). Among the criteria for searching, sorting, and filtering can be availability of delivery, active sales, or high ratings of verified customers, or combinations of them.

Once a merchant has been selected, the customer can search or filter (shop) for one or more specific identified products within the current inventory of that merchant. The online marketplace user interface can include a menu, list, gallery, or other visual device for presenting a catalog of products available at the merchant. The products in the catalog are an accurate, complete, real-time representation of the merchant's actual physical inventory of products. The customer can select products, specify a number of units, provide other information about the products to be bought, and add the products to a cart. Once the products are added to the cart to constitute an order, the customer selects the desired pickup or delivery time and checks out by providing payment information in completing a payment transaction. Then the order is confirmed by the platform to the customer and is sent by the platform directly to the merchant. The retail merchant fulfills the order using, for example, software provided to interact with its POS system by the platform technology.

If, for example, the customer chooses to shop by product on the platform site, he can apply user interface controls of the online marketplace user interface to search or filter the available product information and merchant information to identify a product based on brand, item, category, sub-category, effect, or a variety of other characteristics. Once the product is selected, the customer can read about the product from actual customers, view photos, and compare all merchants having units of the product currently available. The customer can compare those merchants with respect to the selected product by price, customer review, or convenience (distance, estimated delivery time, and other criteria), among other factors. The customer can select one of the merchants and then proceed directly to a payment transaction or to continue shopping in that identified merchant's product catalog and then proceed with the checkout process. The merchant then fulfills the order as described above and later.

On a Merchant Site

In some examples, when the online marketplace user interface is presented on or through a merchant site the customer can use the interface in effect to shop (in the full product catalog of the merchant) directly at the merchant site by searching or filtering for products using any term (e.g. vegan, sleep, Blue Dream) or by searching or filtering by category, sub-category, brand, active sales, or other parameters. Once a product has been selected, the customer can read information about the product, view photos, read reviews from verified customers, and get recommendations of other similar or complementary products. After adding the product to the cart, the customer can schedule a delivery or pickup time, and then confirm the order. Once the order has been placed, the fulfillment can be handled by the merchant as described in the other scenarios.

Customer Activity Information

A wide variety of customer activity information can be accumulated, aggregated, analyzed, distributed by or on behalf of the platform. For example, the customer activity information can include navigational sequences identifying successive user interface actions of a customer on the online site of the product portal. The navigational sequences can include invocations of user interface controls, identities of successive pages visited through a Web browser or on a mobile app, and types of information entered by a customer, and combinations of them. In some examples, the customer activity information can include values of types of information entered by the customer, such as a number of units, a location, a promotional code, characteristics of a product ordered such as color, size, material, and others, a total dollar value of a transaction, demographic information, time information geographic information, and others, and combinations of them.

In some instances, point-of-sale, inventory, or other systems associated with merchants (such as merchants having physical presences) provide to the platform feeds of information about available products, numbers of units, prices, and promotions as described above. Product portals, and sites of merchants also can provide to the platform feeds of customer activity information derived from activities occurring on the sites, even with respect to products purchased from locations of physical presences of the merchants and picked up at or delivered from those locations. For example, information about a purchase transaction conducted by a customer on a product portal, merchant site, or platform site could include the time of the transaction, the location of the physical presence of the merchant, demographic information about the customer, and information about the transaction including monetary amount, promotions, delivery mode, and others. When a purchase transaction made through an online site involves a product available at a location of a physical presence of a merchant, the product may be picked up by the customer at the location or delivered locally to the customer from a location. Yet the information about the purchase transaction can be tied to the product physically picked up or delivered from the location of the physical presence of the merchant, and therefore provide information about, for example, brick-and-mortar retail product sales, that is not available in other systems. In some cases, the technology can match purchase transaction information for such a retail store purchase with customer activity information captured from the online site at which the purchase was made.

In some examples, activities of a given customer represented by customer activity information at two different product portals, merchant sites, or platform sites might be matched at the platform based on feeds received from the two different sites. Other instances could involve customer activity information obtained at the platform from at least two different independent sources that do not normally exchange such customer activity information. Processes running on the technology platform technology could then compare, aggregate, match, analyze, and distribute customer activity information in ways that could not otherwise be done.

A wide variety of information can be captured and supplied by the platform technology as a customer uses a product portal, a merchant site, or platform site. The information could include: customer information (first name, last name, phone, email, date of birth if required by merchant); customer purchasing preferences (customer location, delivery versus pickup), product categories or types; any keyword search terms used; product characteristics of interest, and mode of search (by products (merchant agnostic) or by merchant); discounts, coupon, or promotions applied to the transaction; product selection (brand name, item name, quantity, and product characteristics); merchant information (merchant selected, time and day of purchase); and site information (menu visits, UTM (urchin traffic monitor) parameters, referring URL), among others.

Technology Implementations

Overall Technology Problem and Solution

Before the development of the technology described here, available systems did not offer a way for a brand (or other product supplier, merchant, or platform) to provide on its site comparative, accurate, complete, and current marketplace information for products across multiple merchants or to enable customers on a site to initiate and complete purchase transactions without leaving the site. Among other reasons, this was not possible because merchants were not comfortable feeding their current marketplace information to third-party product portals, merchant sites, or platform sites, or permitting purchase transactions for products offered by them to occur through such sites.

In addition, before the development of the technology described here, a brand could not get customer activity information about customers and their transactions involving products to be picked up or delivered from locations at physical presences of merchants other than basic market survey data, such as data about which product was bought, where it was bought, and when it was bought. Information about who bought the product, why they bought the product, and how they were buying the product was not available, because it was not possible to tie the what, where, and when parameters of purchase transaction information with the who, why, and how parameters of the transaction information.

The technology that we describe here incorporates functions and features and combinations of them to address these shortcomings of existing technology, among others.

The technology provides a platform (including central servers) that operates as a trusted intermediary (e.g., an honest broker) to accumulate, aggregate, store, analyze, and report product information, merchant information, customer activity information, purchase transaction information, and other marketplace information, to and from brands (and other product portals), merchants (including merchants having online presences and physical presences), and platform sites.

The technology provides communication channels among the platform, product portals, merchant sites, platform sites, and other entities to facilitate, manage, and control the flow of the product information, merchant information, customer activity information, transaction information, and other marketplace information in a manner to protect the information at the platform against unauthorized access, for example, as between competitor merchants.

The technology maintains a database of the product information that holds marketplace information provided by sources (for example, competitor merchants and competitor product portals) that would not typically be willing to share the marketplace information directly between them, but are willing to feed the marketplace information in a protected way through the communication networks to the platform for storage there. The database can therefore store a more comprehensive, complete, accurate, current, and comparative body of product information, merchant information, customer activity information, transaction information, and marketplace information than would otherwise be possible. Processes running on the platform technology then can sort, assemble, analyze, study, and manage the body of marketplace information by, for example, taking account of similarities, differences, relationships, consistencies, and other characteristic relationships of records in the database to derive inferences, summaries, conclusions, hypotheses, and other analytical results.

The technology exposes to customers of product portals, merchant sites, and platform sites, user interface controls and elements to present marketplace information. The technology enables the customers to filter, sort, and navigate the marketplace information by invoking the controls of online marketplaces, and to navigate user interface controls and elements presented by the product portals, merchant sites, and platform sites themselves so that use of such other controls and elements can be seamless with use of the controls exposed by the technology in the online marketplace portion of such a site.

The technology provides monitoring processes and communication channels to accumulate and communicate customer activity information, for example, information about customer searching, filtering, navigation, and other actions performed on product portals, merchant sites, and platform sites. The technology sends the customer activity information to the platform servers and stores it in a database there. The customer activity information can then be aggregated, organized, filtered, sorted, analyzed, compared, and used in other ways alone or in combination with product information, merchant information, transaction information, or other marketplace information.

The technology provides communication channels and processes that enable tying information about customers ("customer information") who make purchases at online merchants and notably at online sites of physical merchants to information about the purchases made by the customers. As a result, the technology can provide to brands and merchants, for example, market information at a more detailed and comprehensive level than would otherwise be available for purchases from merchants having physical presences. Such information can include which products were purchased, where the products were purchased, when the products were purchased, who purchased the products, why they purchased the products, and how they purchased the products.

The technology provides communication channels and processes that enable customers to engage in purchase transactions essentially directly through product portals at merchants having online presences and merchants having physical presences, through user interface controls and user interface elements presented on the product portals, merchant sites, or platform sites. When the purchases are made, the platform technology can accumulate information about the purchase transactions and corresponding information about the customer and about customer activities.

As shown in FIG. 1, in some implementations the architecture of the software and hardware of the platform technology includes, on the merchant-facing side, multiple possibly incompatible POS systems owned, controlled, or used by different independent (e.g., competitor) merchants 202, 204, 206. Each of the POS systems typically has an API through which polling and product mapping software 208 (provided, for example, by the platform technology) can communicate with and poll the POS systems for accurate, complete, and current product information and merchant information. The software can map the POS information to information expressed in universal or shared data formats and structures used by the central database 210 at the central server of the platform technology and can then communicate the universally expressed information through the API of the central database.

On the customer-facing side of the platform technology, in various implementations customers 222, 224, 226 can use sites that present online marketplaces including marketplaces 216 hosted by the platform technology directly, marketplaces 218 hosted by and embedded in brand (or other product portal) sites, and marketplaces (e.g., menus) 220 hosted by and embedded in merchant sites and platform sites. Each of the marketplaces 222, 224, 226 is served directly to customers (or delivered, for example, as widgets to be embedded in or integrated with other features of product portal sites or merchant sites) by ecommerce server software 214. The ecommerce server software 214 is supplied by backend software 212 with the product information and merchant information necessary to serve the online marketplaces. The backend software can be run at the merchant or product portal servers or at the central platform technology and obtains the information needed to supply the software 214 from the database at the platform technology.

Database

As shown in FIG. 2, in some implementations, the database maintained by the database server at the platform technology includes the following tables:

1. An inventory table 501 includes fields for an identifier for a merchant 502 where inventory is available, identifiers of products 504 carried by the merchant, counts of units of products 506 available at the merchant, a timestamp 508 indicating the currency of the record, a current price 510 for the product and an identifier 512 of a point-of-sale device or system from which information in the record was derived.

2. A merchant retailer table 514 relates to the merchant ID field 502 of table 501, includes an address 516 of the merchants, and latitude and longitude 518, 520 of what is in this case a physical merchant (e.g., a brick-and-mortar merchant).

3. A cart inventory table 522 relates product in a cart of an online site to product units identified in a record of the inventory table. Each record of the cart inventory table includes an inventory identifier 524 corresponding to a record in the inventory table, a quantity 526 representing the number of units of the product, the timestamp 528 capturing the time when the cart inventory table record was created, and the cart identifier 530 associated with entries in the cart table 532.

4. A cart table 532 contains a record for each cart initiated by a customer on the online site of the merchant. A record in the cart table includes a cart identifier 534 associated with the card identifier 530 of table 522, a merchant identifier 536 associated with one of the records of the merchant retailer table, a timestamp 538, and identifier 540 of the customer who initiated the cart on the online site.

5. A product table 542 includes a record for each product encompassed by the platform technology across all brands and all merchants. A product record includes an identifier 544 relating the table to the corresponding record of the inventory table 501, a brand identifier 546 of the brand associated with the product, the category identifier 548 associated with the category to which the product belongs (such as electronics), a subcategory identifier 550 associated with a subcategory to which the product belongs (such as big screen televisions), a product name 552, attributes of the product (such as color), a stock keeping unit 556, the description of the product 558, and one or more photographs 560 of the product.

6. A category table 562 contains a record for each product category including a name 564 of the category.

7. A subcategory table 566 contains a record for each product subcategory including a name 568 of the subcategory.

8. A brand table 570 includes a record for each brand encompassed by the platform technology, including a name 572 and an address 574 of the brand.

9. A partner brand table 572 contains records each of which identifies a brand partner 574 associated with one of the brands.

10. A brand partner table 576 merchants the name 578, the address 580, and the type DLXXXII of the brand partner.

Technology Organization

As shown in FIG. 3, in some implementations, the technology includes or involves a central platform 302, one or more product portals or other sites (such as a site hosted by the platform itself) 304, customers 306, one or more merchants 308 having online presences, and one or more merchants 310 having physical presences. Each of the merchants having an online presence can also have one or more warehouses 309 for storing products available in inventory. Each of the merchants having a physical presence can also have one or more physical locations 311, such as retail stores, at each of which are held units of products available for pickup or delivery. The platform, online merchant sites, physical merchant sites, product portals, and customers can communicate with one another through the Internet or another communication network.

The platform 302 can include a general server 320 running a variety of processes 322 including communication processes, analytical processes, platform participant registration and profile processes, and others. Also part of platform 302 can be a database server 324 that manages a central database 326 containing marketplace information, platform participant information, and potentially a wide variety of other information useful in managing and operating the platform. A transaction server 328 can manage purchase transaction processes directly or indirectly through a product portal, an online merchant site, or a physical merchant site. An online marketplace server 330 can assemble, generate, manage, and serve online market places for presentation through a product portal 304, an online merchant site 308, or physical merchant site 310, among other places.

The product portal 304 can serve a site 332, such as a website or mobile app, through the Internet to customer devices 334. The site 332 can exposed to customers a wide variety of functions, features, information, controls, elements, and other devices. These can include a brand presentation 336, for example, in which information about a brand and its products are presented, purchase transaction features 338 such as a checkout cart or other ordering facility, and an online marketplace 340 that can be configured as a plug-in, add-on, or widget provided from the platform. The product portal also can provide as part of the site, monitor processes 342 for monitoring customer activity with respect to the site to generate customer activity information described earlier. In some implementations, the product portal contains or has access to a database 343 that can store wide variety of information associated with operation of the product portal, including product information 344, customer information 346, customer activity information 348, transaction information 350, and merchant information 352. Information stored in the database can be coordinated with and synchronized with the platform database and with databases managed on behalf of online merchants and physical merchants. In some cases, the product portal can include a business server 354 that can run processes 356 for business purposes, such as analytics processes 358.

Each of the online merchants in the physical merchants can maintain a server 360, 362, point-of-sale systems (not shown), and databases 364 366 can store, manage, and share with product portals of the platform, in certain cases, product information 368, 370, customer information 372, 374, transaction information 376, 378, and merchant information 380, 382.

Delivery of Online Marketplaces

As shown in FIG. 4, in some implementations, the marketplace information 402 can be presented directly as part of and within (for example, embedded within) existing user interface features 404 of the online site 406 of the product portal 408 using the current, complete, accurate, and comparative marketplace information 410 stored in the database 412 and managed by the database server 414 of the platform technology 416.

For this purpose, platform technology integration software 420, 422 is installed at each online merchant and physical merchant 423, 424. The platform technology integration software interacts with and continually fetches current, complete, and accurate product information from databases 425, 427 maintained by existing point-of-sale (POS) systems 426, 428 controlled by the merchants. Among other things, the fetched product information includes product identifiers 430, 431, counts of available units of inventory of each product 432, 433, and prices for the products 434, 435.

The platform technology integration software sends the fetched marketplace information to the platform essentially in the form of records each of which covers a particular identified product available at the merchant whose POS system is the source of the record. Each record also includes a unique identifier of the point-of-sale system that was the source.

Therefore, the platform servers continually receive marketplace information records from one or more of the merchants. A matching process 436 running on the business server of the platform technology matches each incoming record of product information for a given product from each of the merchants to the unique product identifier corresponding to that record as indicated in the product table 542. Every different product offered by each merchant across all merchants and associated with all product portals (brand) is tracked and matched uniquely according to its corresponding unique product identifier. Once the product identifier has been located in the product table, the platform technology server process can update the corresponding record of the inventory table 501 based on the inventory product information contained in the incoming record.

Although each of the product identifiers is unique and every incoming record is matched to the correct product using the unique product identifiers, multiple records for a given product can be included in the inventory table 501. For example, if five different merchants have available in inventory units of a given product, the inventory table would include five records for that product representing the available units at the respective merchants. This information enables the platform technology to incorporate in the presentation of comparative product information and merchant information data about units of a given product across multiple merchants.

As a result of this continual process of receiving, matching, and storing product information records from all of the merchants, the central database at the platform technology can always contain product information and merchant information about available units and prices (and a variety of other information) for every unit of every product that is currently in-stock at every merchant encompassed by the platform technology.

Because the product table 542 of the central database contains a brand identifier for every product associated with the brand, the processes running on the platform technology server can identify all of the units of each of the products of each of the brands (and their prices and other information) that are available at any given time across all merchants that handle products of the brands.

Based on the comprehensive, accurate, complete, current, and comparative marketplace information for all units of all products of each brand available from all merchants at a given time, the platform server has information sufficient to enable it to manage, organize, study, and present or project one or more online marketplaces for those products through online sites controlled or hosted by product portals (e.g., brands) or other parties.

An online marketplace can be presented online in a variety of contexts. In some implementations, a product already has been identified by or on behalf of a customer as being a product of interest based on customer activities on a brand site or other product portal, or a merchant site or a platform site. In some cases, the marketplace can be presented online independently of online sites of brands or other product portals or merchants or the platform. In effect, such an online marketplace can provide a window or port into the current inventory "catalog" and prices of multiple competing merchants and simultaneously into the purchase transaction system of each of the merchants. The portal presents marketplace information that is complete, current, accurate, and comparative, so that a customer can identify products and compare availability and pricing at multiple merchants, choose one for acquiring the product, and then (without leaving the online marketplace) pay for the product through the payment transaction facility of the chosen merchant.

One or more online marketplaces can be generated and served by the platform technology to one or more sites, for example, by providing an embeddable web application code snippet to be placed anywhere on the site. The resulting user interface presentation can appear as if it were an integrated part of the site. Other approaches to delivery of an online marketplace, or information necessary for a third party to generate and present the online marketplace, can also be used.

Because the platform database contains marketplace information spanning a wide range of products, brands and other product portals, and merchants, the platform technology can assemble and serve multiple online marketplaces. Each online marketplace can be focused on a specific set of products, or a specific brand, or a specific geographic region where merchants are located, or on other characteristics. An online marketplace can span multiple products, multiple brand, multiple geographic regions, or multiple categories of merchants, and combinations of those.

In some implementations, the marketplace information of each of the online marketplaces is provided from marketplace information maintained by or on behalf of the merchants through one or more communication networks either directly to the product portals or other sites or, more commonly, indirectly through the platform host to the product portals or other sites. The marketplace information from the merchants is aggregated for presentation through pages of the product portals or other sites. In some implementations, the aggregation can be done at the product portals or other sites. In some implementations the aggregation is done by the platform technology and the aggregated product information is then sent in aggregated form to the product portal or other site.

User Interfaces

In various implementations of the platform technology, user interfaces are provided to enable a customer to interact (through a mobile device, a workstation, a kiosk, a laptop, a mobile phone, or other user device, for example) with an online marketplace presented by a platform host, or an online marketplace presented by an online merchant, or an online marketplace presented on a brand site, or combinations of these. The online marketplace can be presented through a standalone application or a mobile app or through a Web browser, for example.

Figure 5:
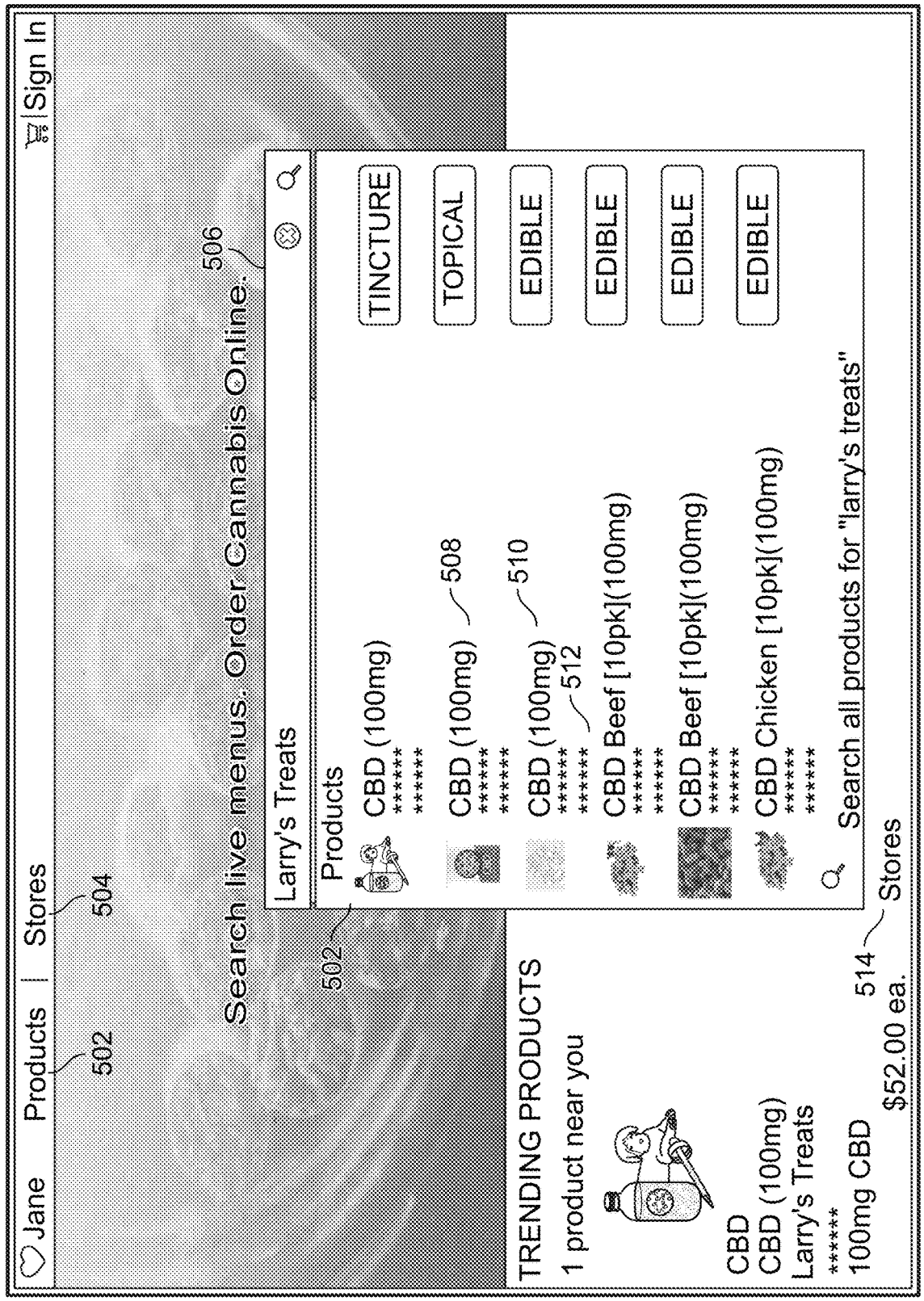

As shown in FIG. 5, in some implementations, the platform host (in this case the platform accessible at "iheartjane.com"), provides tabs 502, 504 enabling the customer to search by product or by merchant.

In FIG. 5, a customer has entered a product name "Larry's treats" in a text search box 506 and is shown a list of products matching the search query. Each product is identified by selected characteristics or parameters, in this case a product type, such as CBD topical 508, a weight 510, and a form of use 512. By clicking on the bar titled "stores" 514 the customer can view (FIG. 6) a gallery 602 of the products found in the search that are available at physical merchants near a particular geographic location 604, such as a current location of the customer. The customer can change the location of interest by clicking on the change location button 606. Each panel of the gallery describes an available product and includes a graphic 608, information 610 like the information shown in FIG. 5, and a real-time price 612 for which the product can be bought. A box 614 enables the customer to define the distance from the selected location applicable to the products to be displayed. Conventional filtering controls 616 enable the user to filter the displayed products. If the customer clicks on a product, for example, product 618, the user interface presents the page shown in FIG. 7.

Figure 7:
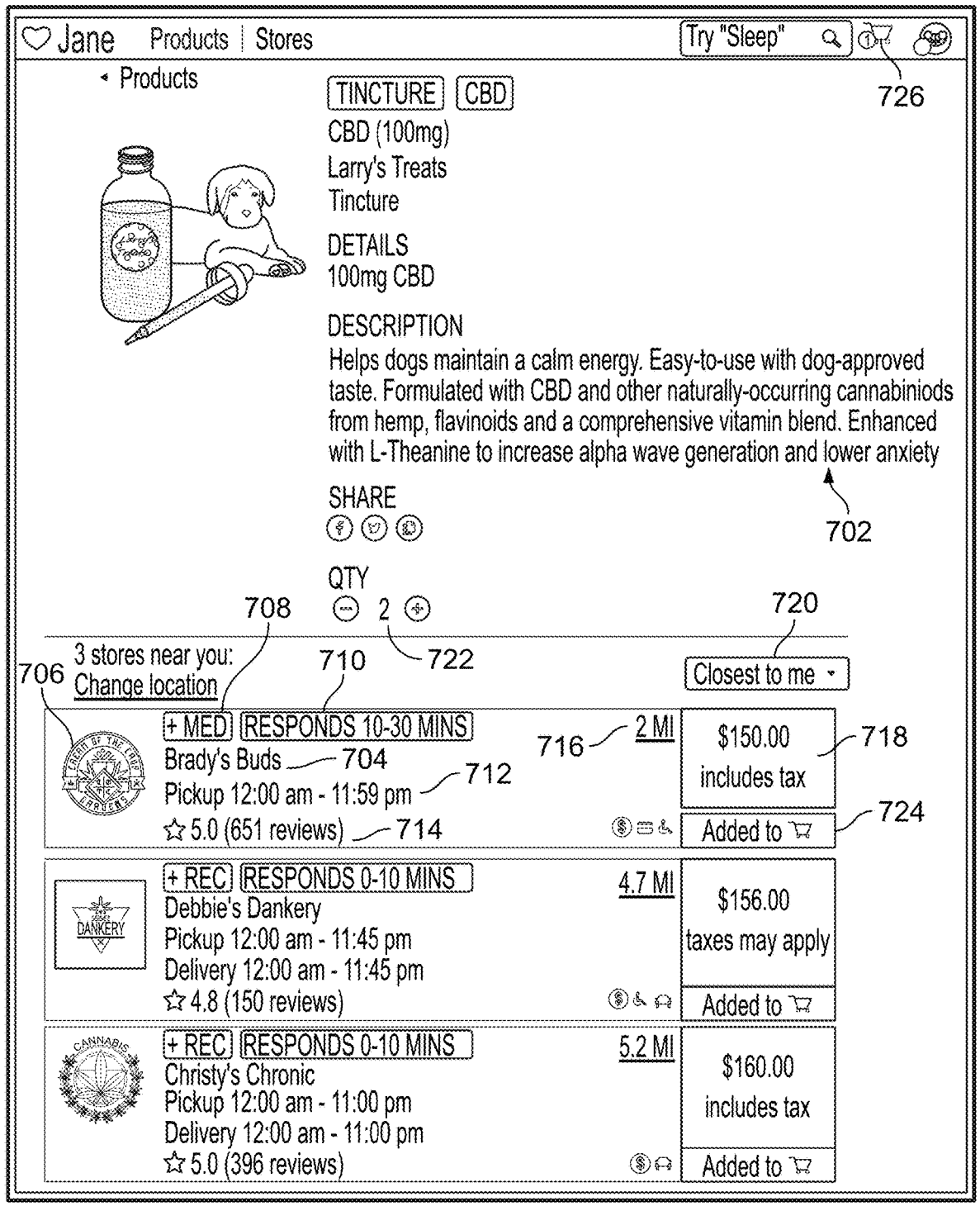

The page of FIG. 7 provides additional information 702 about the product, provides immediate, real-time, accurate, complete, and comparative information about specific merchants within the identified distance of the identified location at which the product is actually available and the merchant is open for business. In the example of FIG. 73 several such merchants 704 are identified. With respect to each of the merchants at least the following parameters and characteristics are presented: logos 706, the type of store 708 (for example medicinal or recreational), a period of time for response by the merchant 710, available times for pickup 712, a review rating 714, a distance 716 from the selected location, and a current price 718. A drop-down menu 720 enables the customer to sort the stores by distance, by price, and by other characteristics. The page of FIG. 7 also enables the customer to directly (without leaving the page) begin the process of making a purchase of a product at a particular merchant including indicating the number of units 722 of the product to be bought and indicating that the product should be added to a cart 724. By clicking on the cart icon 726, the customer can continue with and finish the purchase transaction on the page of FIG. 8, which is presented by the platform host (in this case Jane) on the merchant's site. To accomplish this, the platform host embeds appropriate controls and features directly into the merchant site. Although the page of FIG. 8 is identified as presented by the platform host, the page could be presented with "private-label" logos and marks associated with the merchant and similar to those presented on the native pages of the merchant's site.

Figure 8:
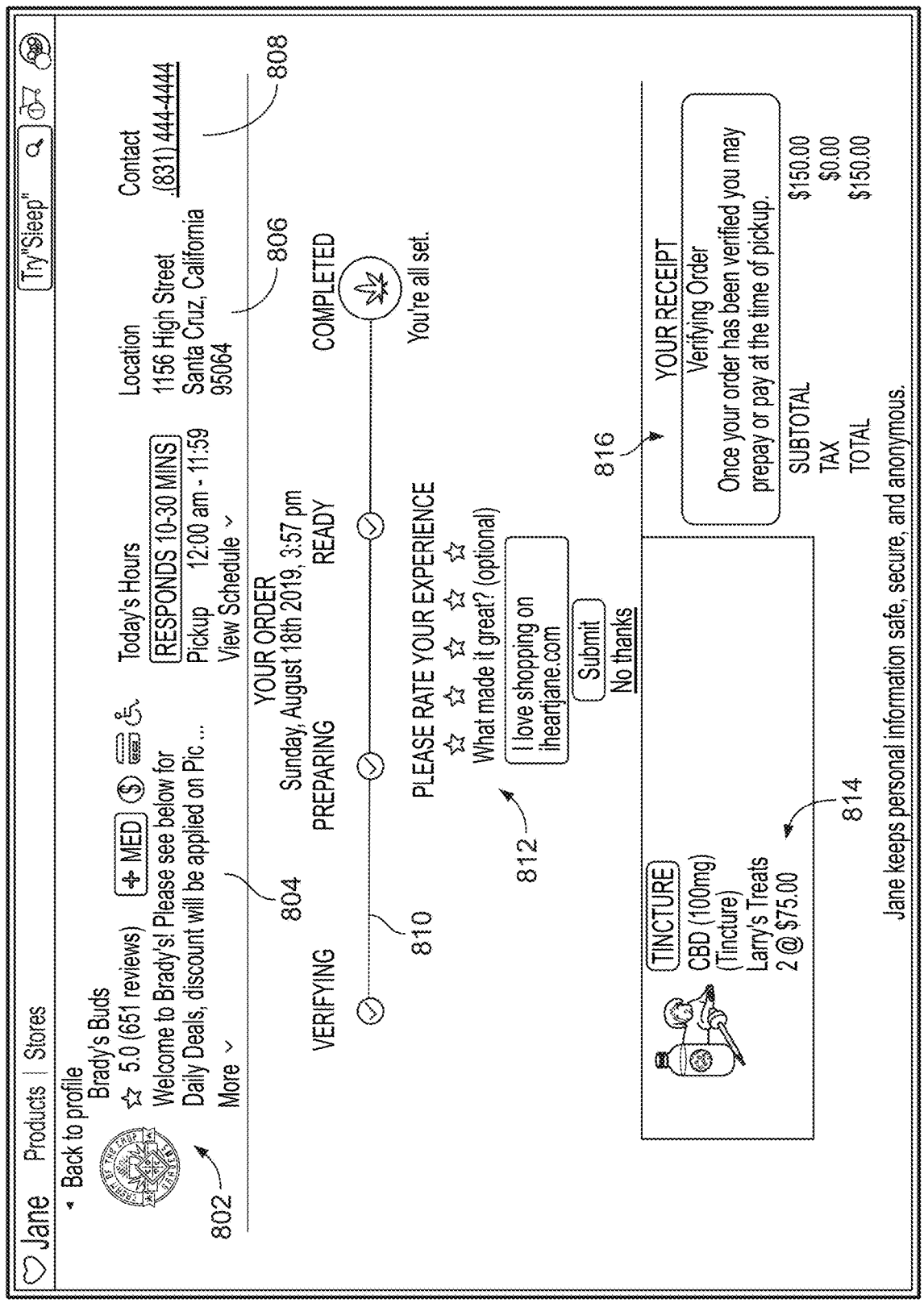

As shown on FIG. 8, additional information 802 is provided about the physical merchant from whom the product is being purchased. The additional information can include a marketing message 804 provided by the merchant to the platform host for presentation by the platform host to the customer, the location of the merchant 806, and contact information 808. A progress line 810 illustrates progress in completion by the platform of the purchase transaction. Order details 814 are shown next to information about the progress stage 816 in completion of the purchase transaction.

In the case of some products, for example regulated cannabis products and other kinds of products to be picked up under controlled delivery, the product covered by the purchase transaction must be prepared by the merchant for pickup by the customer. The preparation can take a period of time. To keep the customer updated on the progress of the preparation, once the order has been completed on the page of FIG. 8, the platform can redirect the user interface to a page of a user interface served by the merchant, such as shown on FIG. 9.

Figure 9:
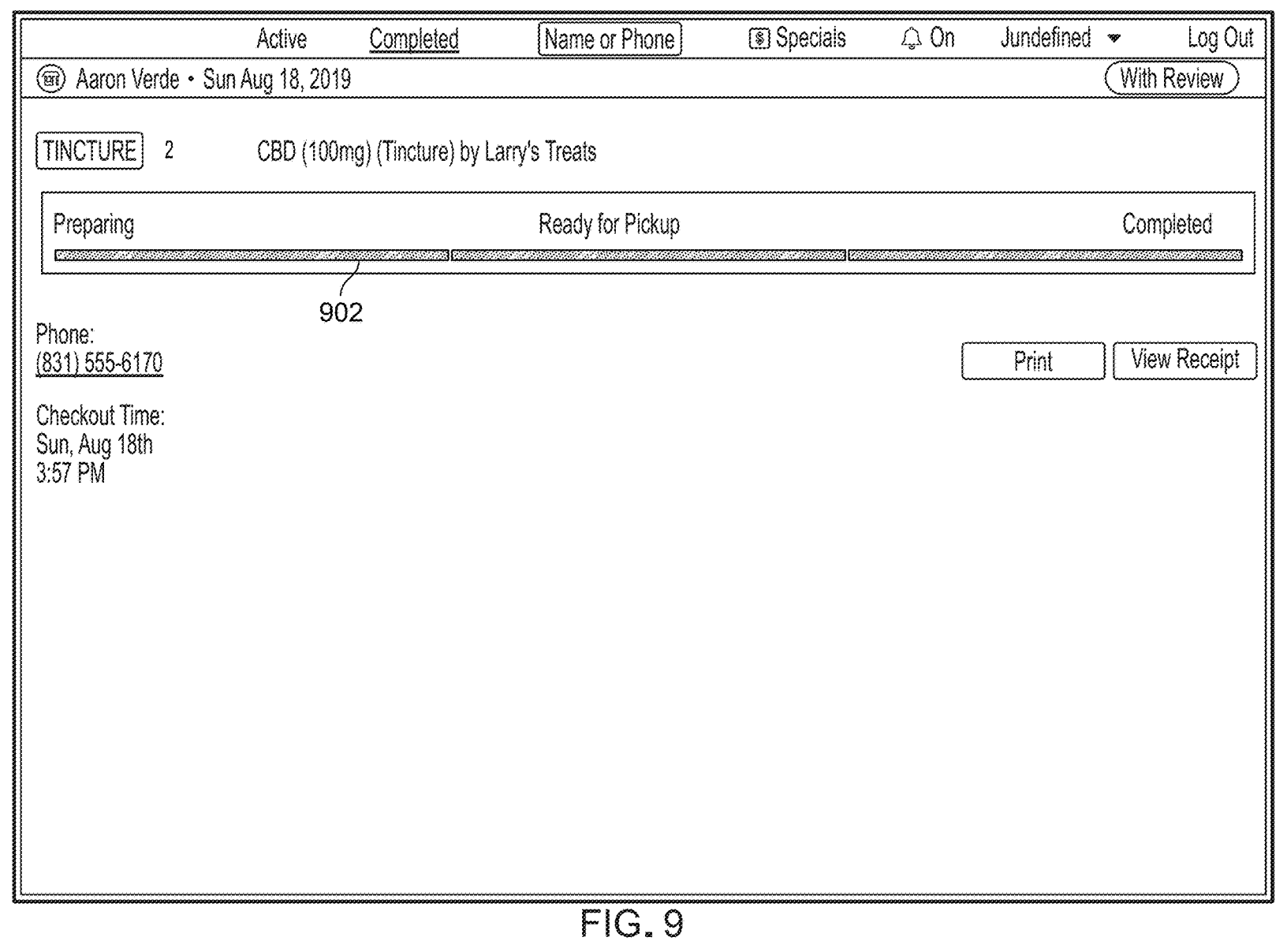

On FIG. 9, the customer can view a progress bar 902 showing progress in the steps of preparing the order including preparation, ready for pickup, and completed (that is, picked up by the customer).

Figure 10:

In some implementations, in which the customer directly uses a merchant's online site to search, select, and buy products, the customer could first be presented with a splash screen like the page shown in FIG. 10. When the customer clicks on the "shop our menu" button, the server presents the page of FIG. 11.

Figure 11:
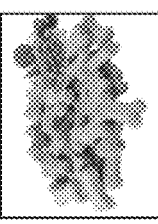

FIG. 11 presents to the customer a search box 1102, a gallery of products located by applying the search to the inventory database of the merchant, filtering controls 1108, and information 1106 about products that have been added by the customer to a cart that is part of a purchase transaction process hosted by or on behalf of the merchant.

When the customer clicks on the cart icon 1110, the page of FIG. 12 is presented including information 1202 about the planned purchase transaction and suggestions 1204 for other products that may be of interest to the customer. When the customer is ready to complete the purchase transaction, the same page as shown in FIG. 8 is presented showing progress in the steps of fulfilling the delivery of the product in accordance with the purchase transaction.

Once the customer has completed the purchase transaction, the merchant is presented (through the merchant's fulfillment software) a page such as the page shown on FIG. 9 which enables the merchant to manage the process of preparing the product for pickup according to the reservation. A progress bar 902 shows the steps of preparing the product, having it ready for pickup, and having completed the delivery to the customer.

In some instances, the customer uses a brand's online site to search and select products that are part of the brand and to search and select merchants where the products are known to be available based on real-time information maintained by and communicated from the platform and presented through the brand's online site.

Figure 13:
Figure 14:
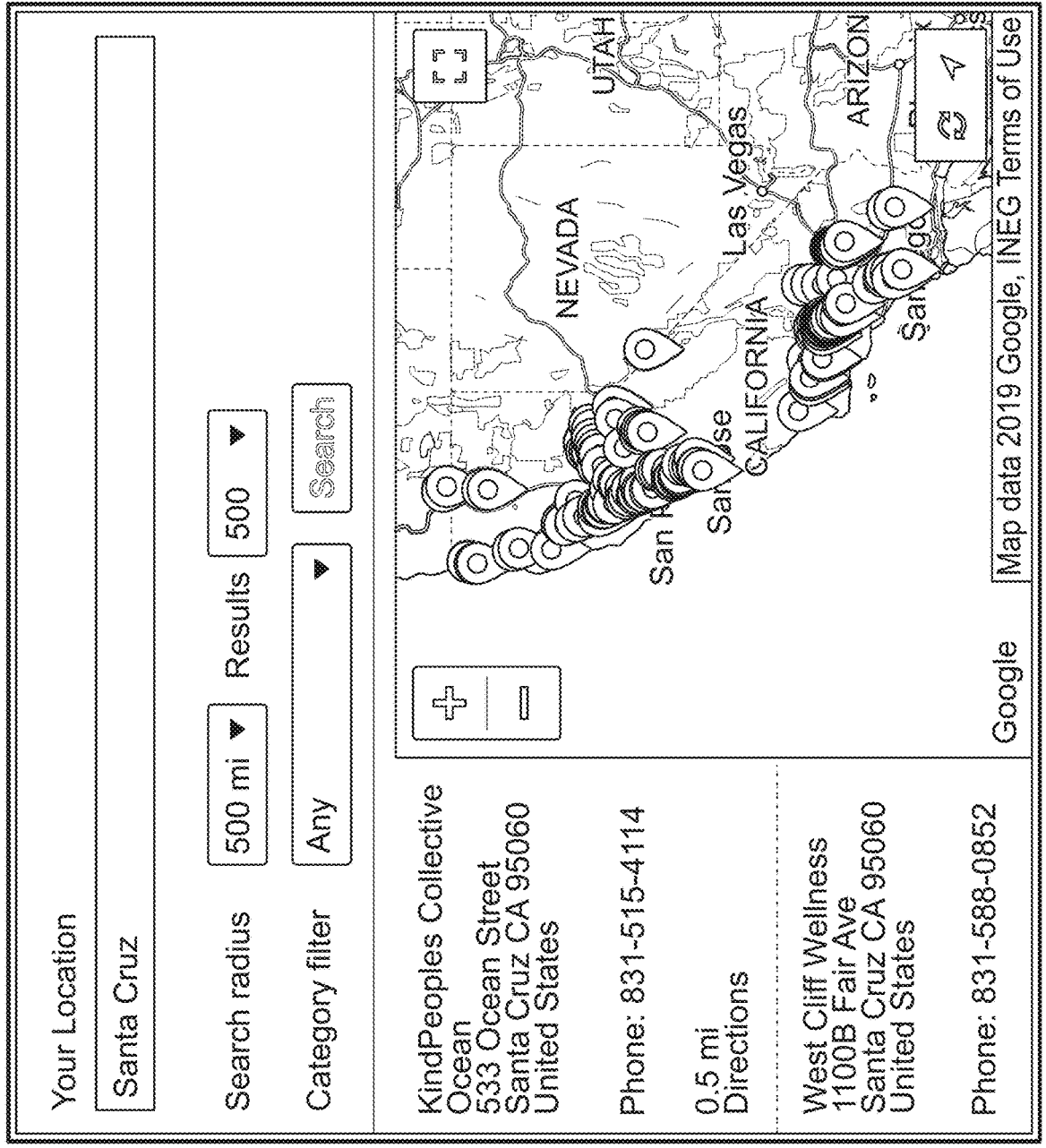
Figure 15:
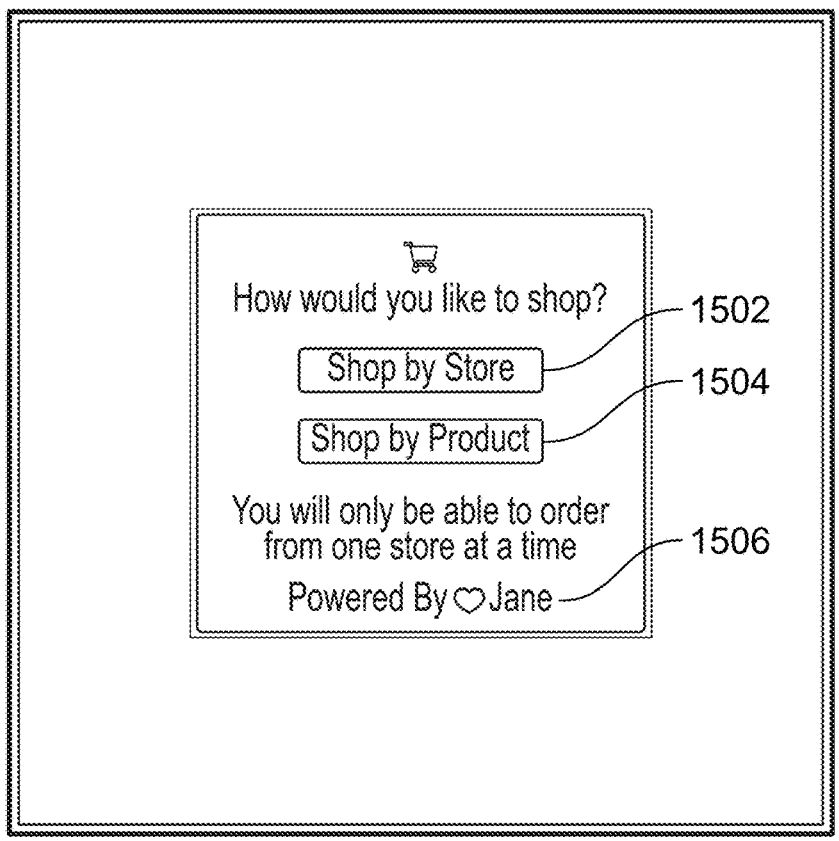
Figure 16:
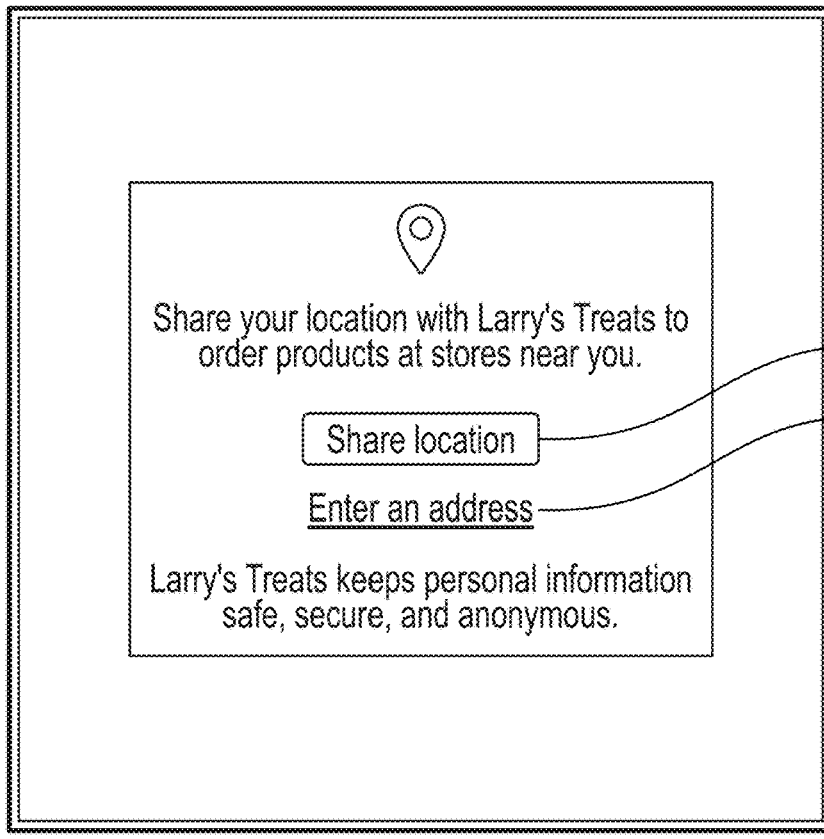

A brand site (in this case for the brand of products branded as "Larry's treats") is shown in FIG. 13. When the customer clicks on the "find us on a map" button 1301, the customer is presented with the page of FIG. 14 showing, on a map, indicators of locations at which brand products of the brand are available. When the customer clicks on the "shop right now" button 1302, the platform presents through an embedded page shown on FIG. 15 a choice to be able to click a "shop by store" button 1502 or a "shop by product" button 1504. Notation 1506 alerts the user that, although the page of FIG. 15 has been embedded within and is being presented on the brand site, it has been supplied by the platform host (in this case Jane). Whichever of the buttons 1502, 1504 is invoked, the platform presents the page of FIG. 16 asking the customer to either share her location by clicking the button 1602 or to enter an address by clicking the link 1604.

Figure 17:
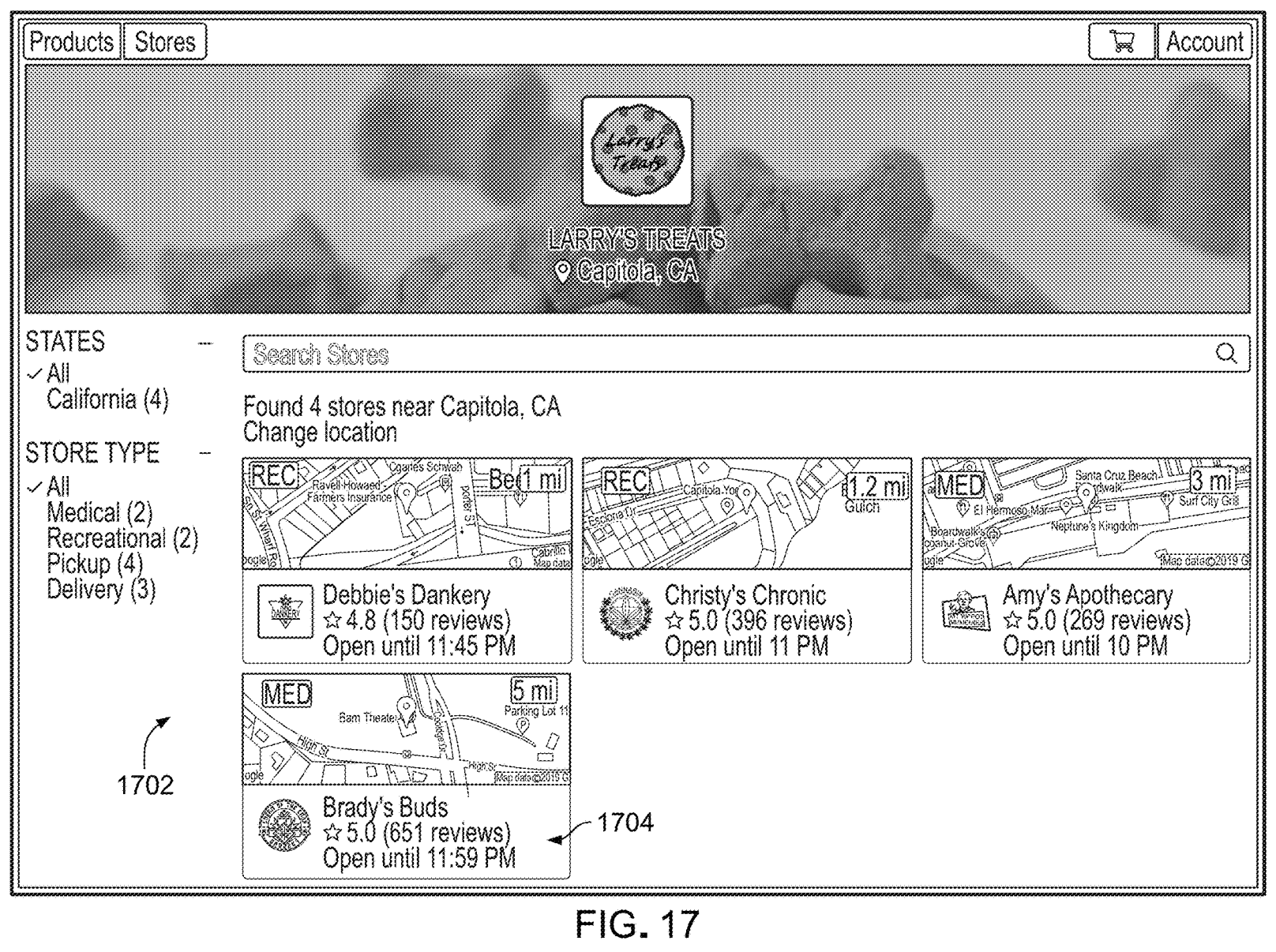

If the customer has chosen to shop by merchant (e.g., store), the page of FIG. 17 is presented on the brand site, providing a gallery 1702 of stores located near the identified location of the customer, in this case Capitola, Calif. The presented stores are stores that are known from real-time data in the database of the platform to have available products of the brand. The selection of stores presented on FIG. 17 is determined by the platform based on its real-time information about merchants and brand products.

Figure 18:
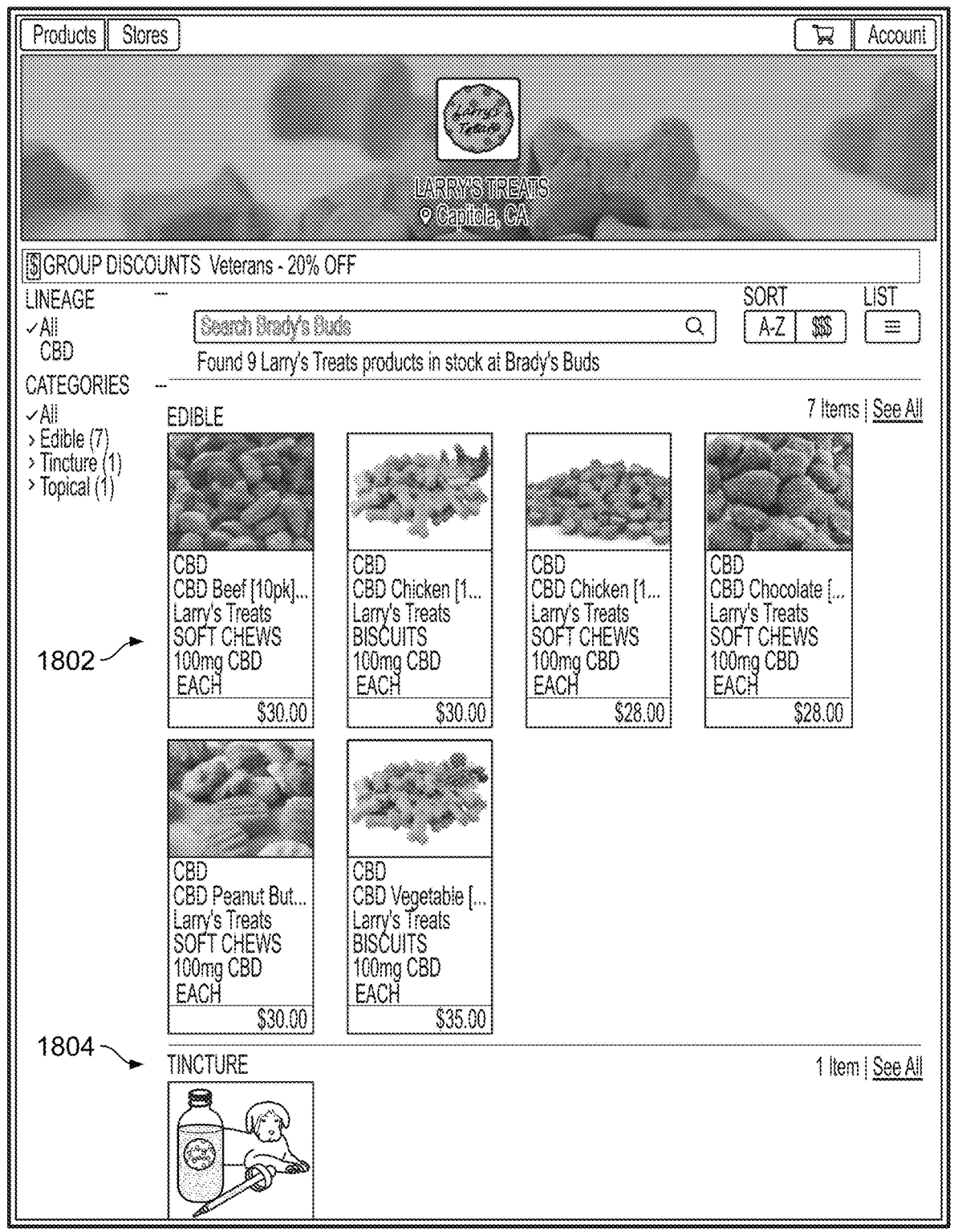
Figure 19:
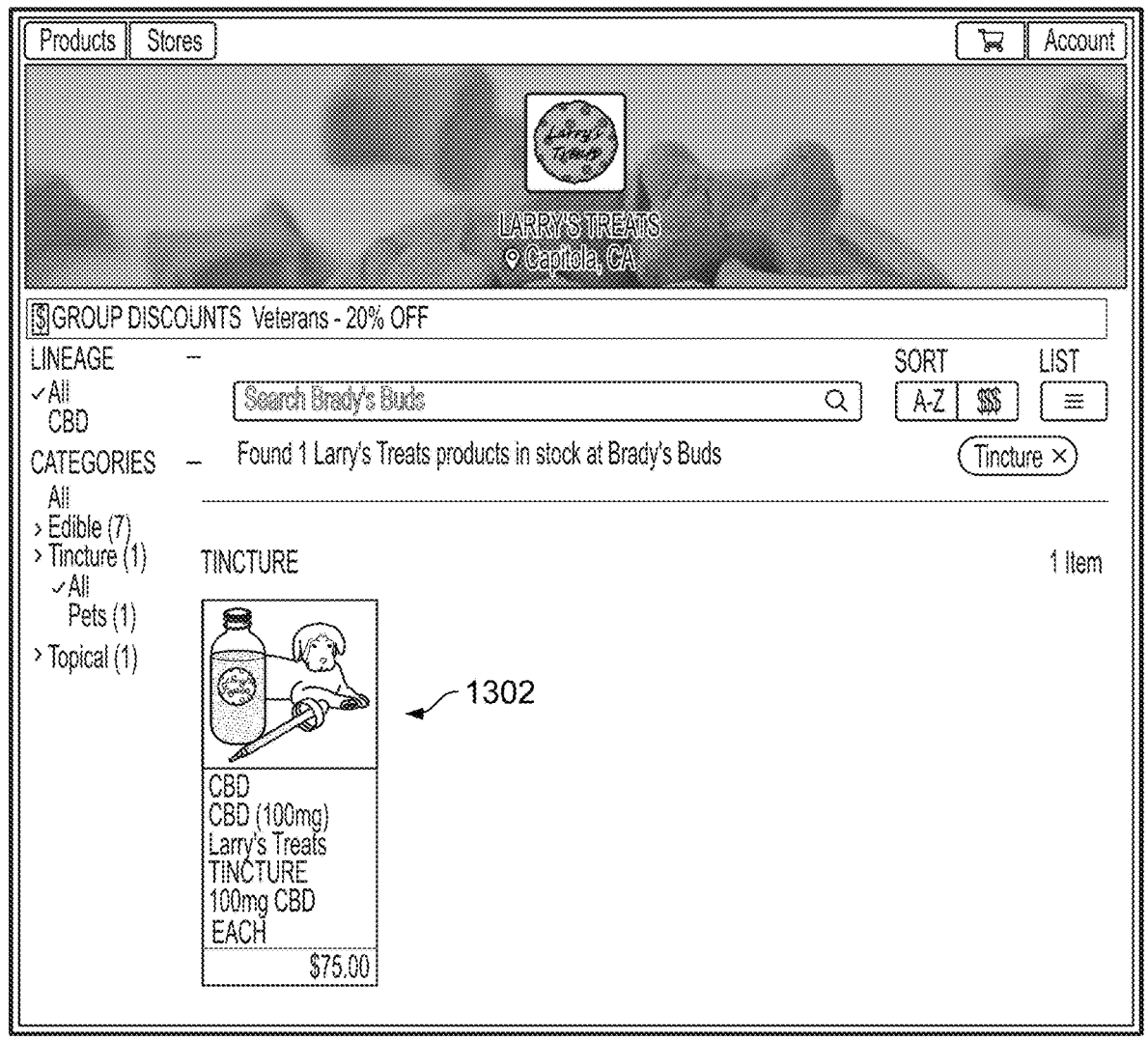

If the customer were to invoke, for example, the store "Brady's Buds" 1704, the customer can be presented the page of FIG. 18 on the brand site. FIG. 18 presents a gallery 1802 of products belonging to the brand and that are known to be available at the store "Brady's Buds," based on real-time information maintained by the platform. The current price of each of the products is also shown. By invoking one of the product panels of the gallery, in this case the tincture 1804, the page of FIG. 19 is presented showing detailed information about that product. If the customer wants to buy the product shown in FIG. 19, she can invoke the control 1902 to put the product in a cart for purchase at "Brady's Buds."

Figure 20:
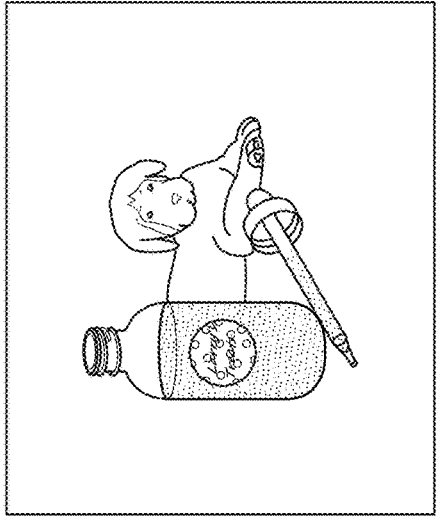
Figure 21:
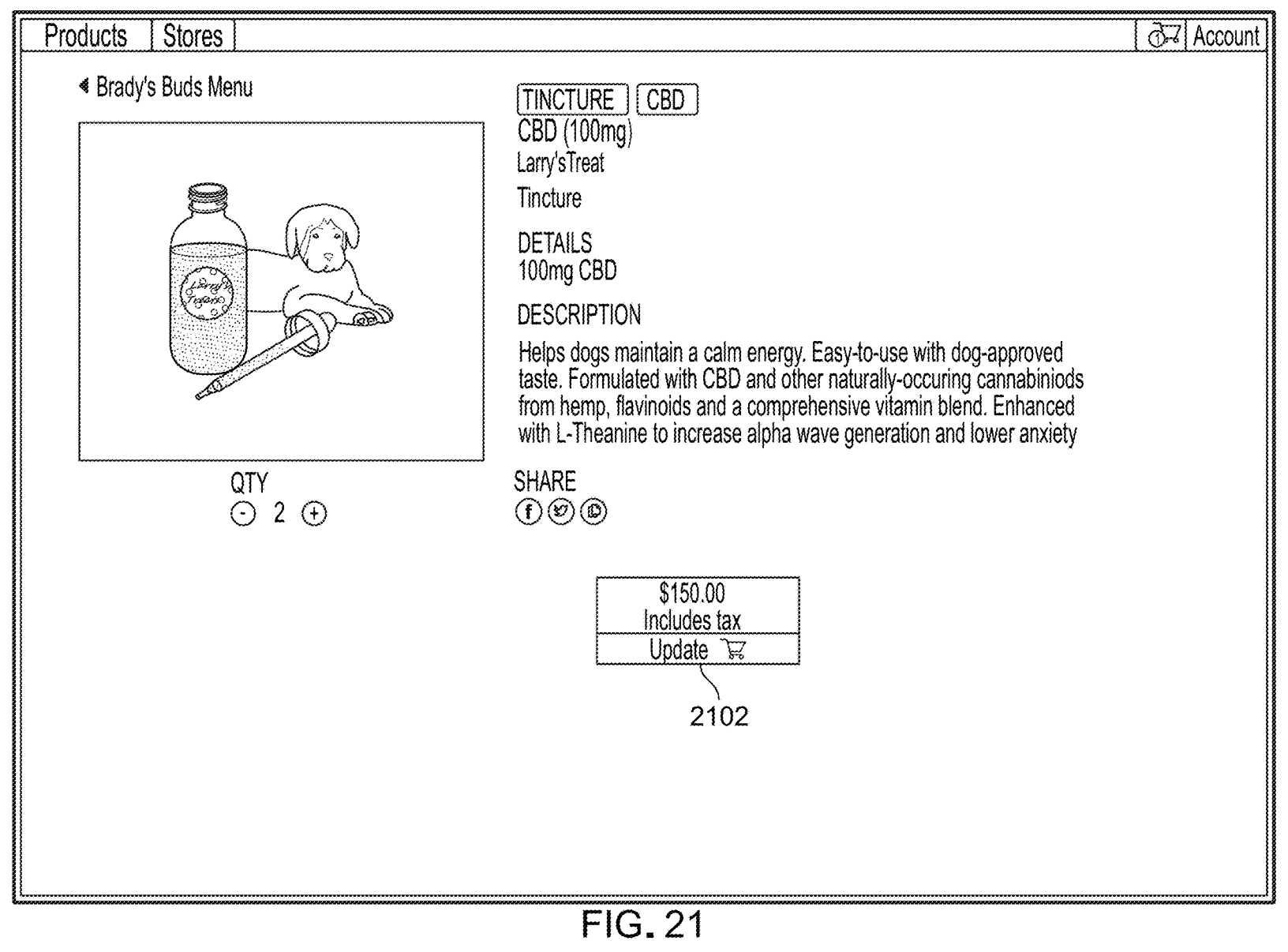
Figure 22:
Figure 23:
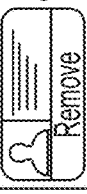

On the page of the next FIG. 20, the customer is presented additional information about the product and a quantity control to enable an additional step of a purchase transaction for buying the product at the store. If, for example, the customer increases the quantity to 2, the total price is updated as shown in FIG. 21 and the customer can confirm the updating by clicking on the control 2102. Typical additional steps for completing the purchase transaction can be performed by the customer using the controls on the page shown in FIG. 22. If discount information is provided, additional information may be requested from the customer (such as proof of military service and a promotional code) as shown on the page of FIG. 23.

Figure 24:

As shown on the page of FIG. 24, additional steps in the completion of the purchase transaction can include a selection of a reservation time 2402 and identification of required documents 2404 for the customer to pick up the purchased product. This information is especially relevant for certain kinds of products including cannabis and other regulated products, and may not be necessary for typical consumer products. When the page of FIG. 24 has been completed, the customer can click on the "confirm reservation" button 2402.

All of the purchase transaction steps shown in the pages of FIG. 17 through 24 are presented to the customer on the brand site. The purchase transaction process, however, is managed by the platform on behalf of the merchant and based on real-time information continuously provided by merchants that have branded products available, as discussed earlier.

Figure 25:

When, instead of shopping by merchant, the customer has decided to shop by product, the page of FIG. 25 is presented including a gallery 2502 of the brand products available near the customer's identified location. As before, the customer can choose a product by invoking one of the panels of the gallery and proceed to pages that enable completion of a purchase transaction for the product. On the page of FIG. 26, the customer can indicate the quantity of units of the product she wants to buy. The customer also needs to identify the merchant from whom she wishes to buy the product, because up to this point, she has been selecting products without reference to a particular merchant.

Figure 26:
Figure 28:
Figure 29:
Figure 30:
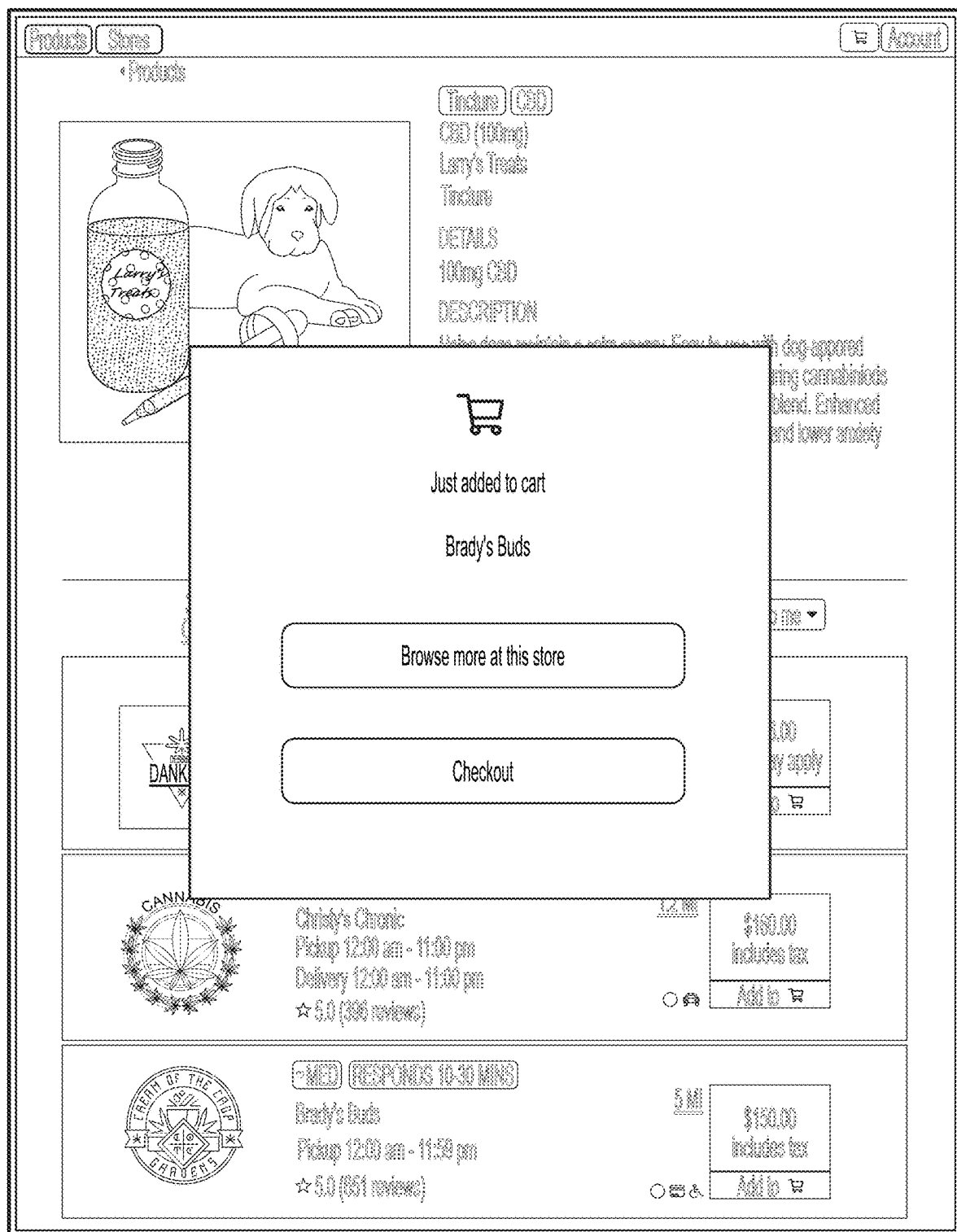

As shown on the page in FIG. 26, directly on the brand site, the platform can display a list of merchants 2602 near the customer's location at which the selected product is known to be currently available. The price of the product 2604 at each of the merchants is also presented. A control 2606 enables the customer to sort the list of merchants by distance from the customer or by price (FIG. 27) or by popularity (FIG. 28). On the page of FIG. 29, a control 2902 enables the customer to select the quantity of the product which causes the total price to be shown in the price: 2904. By clicking on the add-to-cart icon 2906, the customer can begin the purchase transaction process (e.g., checkout), after clearing the opportunity to browse further as shown on the page of FIG. 30. The purchase transaction process then proceeds as previously described.

As illustrated in the preceding figures, the customer is not only able to identify in general merchants that may carry products of the brand from time to time, but can also immediately (without leaving the brand site) review competitor merchants that are known to actually have available selected products (based on real-time information accumulated and maintained by the platform). The customer also can see (presented together on one screen) actual competitor prices for the given product. Then, also without leaving the brand site, the customer can complete a purchase transaction for a selected number of units of one or more selected products at a selected merchant. In effect, the platform embeds (with the same look and feel as the rest of the pages of the brand site) a portal or view into the inventory and catalog of each merchant at which brand products are available, the real time availability, the prices, and other information. The platform enables the customer while working on the brand site to make a direct real-time comparison of competitor merchants, competitor prices, and other factors, and then select a product and a quantity and complete a purchase transaction, all without leaving the brand site.

Figure 31:
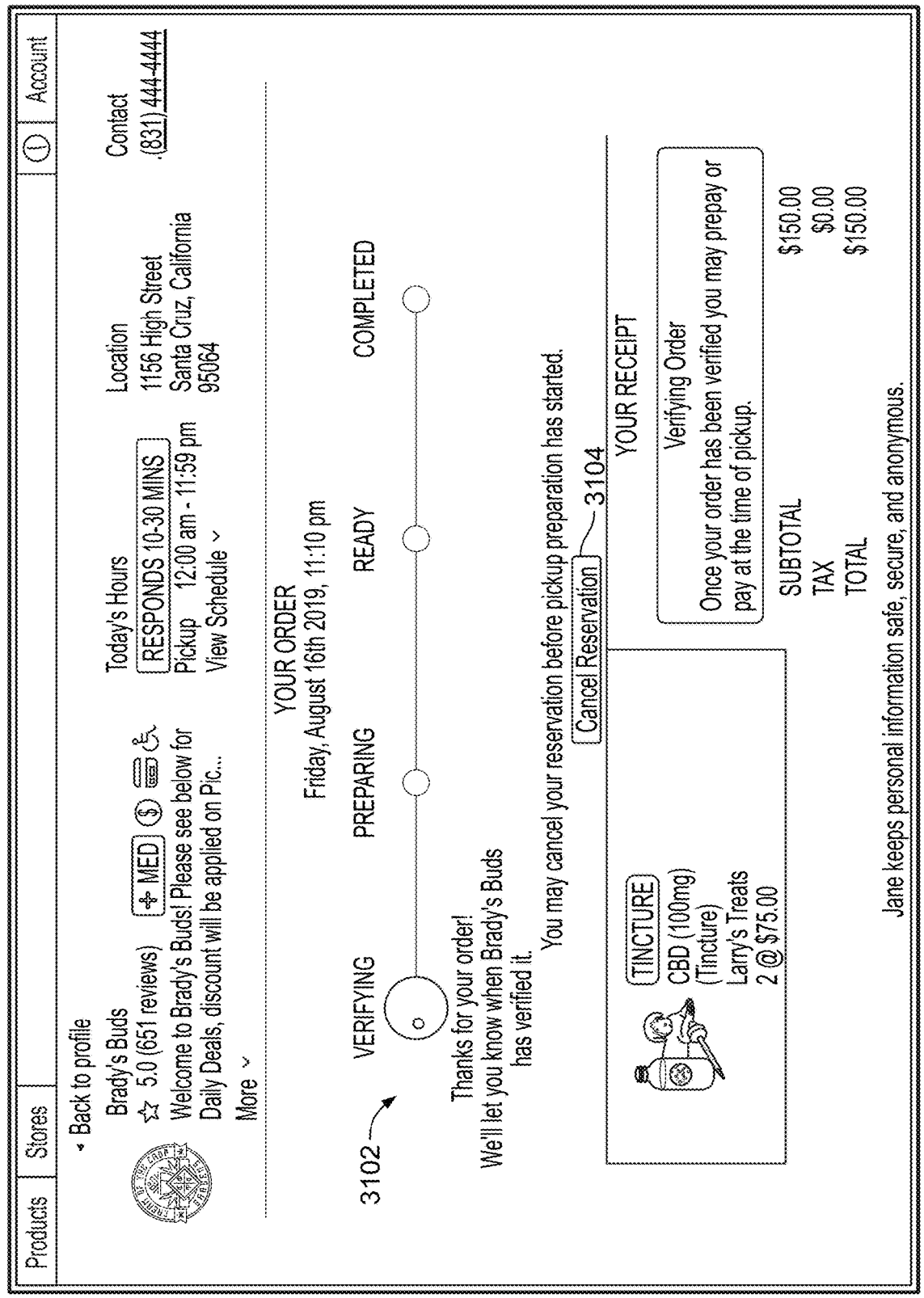

As shown on the page of FIG. 31, the platform causes the brand site to present a confirmation of the purchase transaction (which in this case, because of the nature of the product, is characterized as a "reservation" which needs to be verified and prepared). As discussed earlier, the page of FIG. 31 reports the completion of a succession of steps 3102, including verifying, preparing, having ready, and completing the purchase transaction. By invoking the control 3104, the customer may cancel the reservation.

Figure 32:
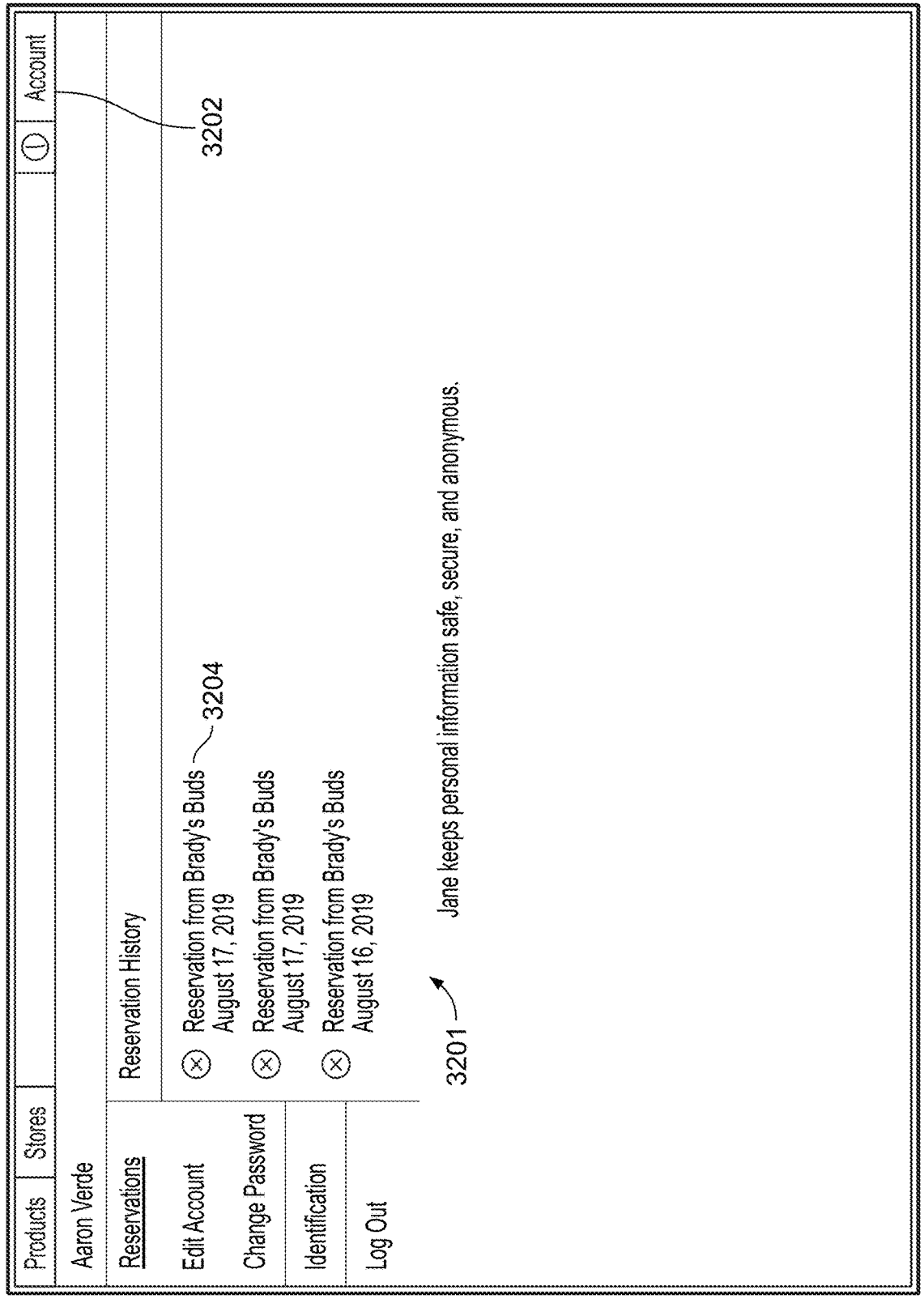
Figure 33:
Figure 34:
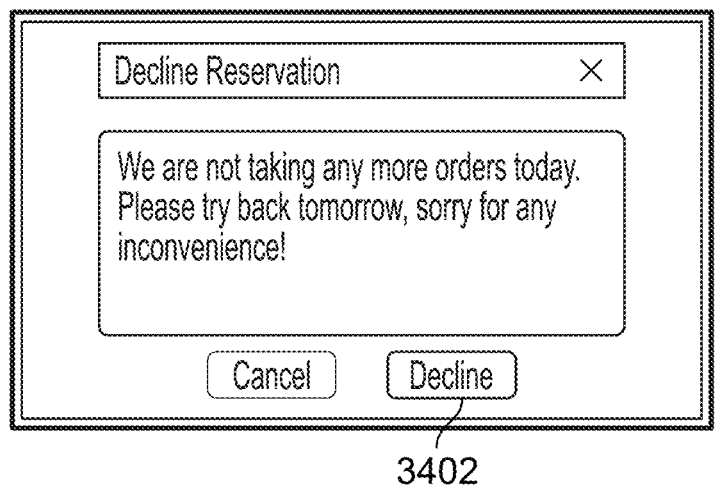
Figure 36:
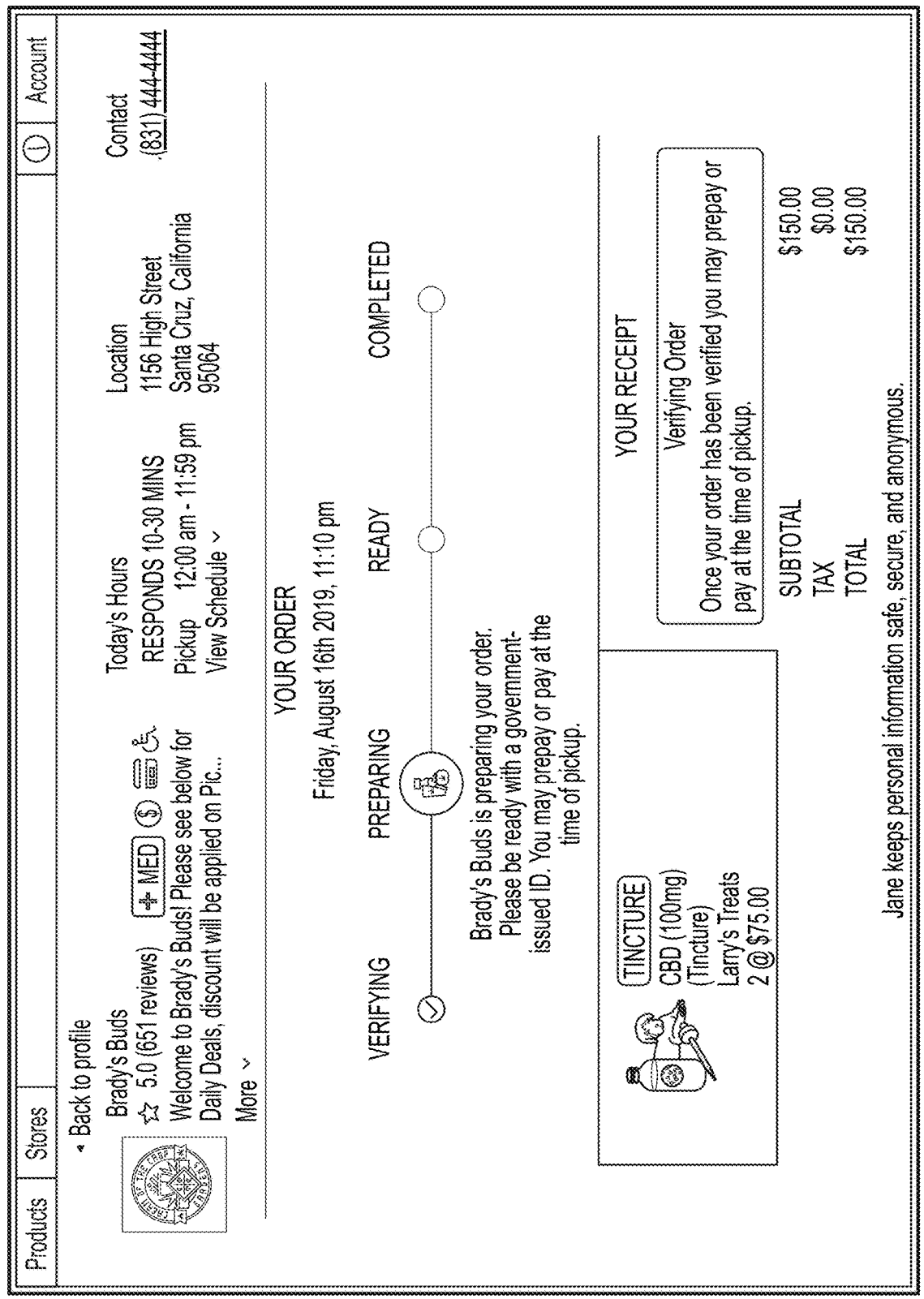
Figure 38:
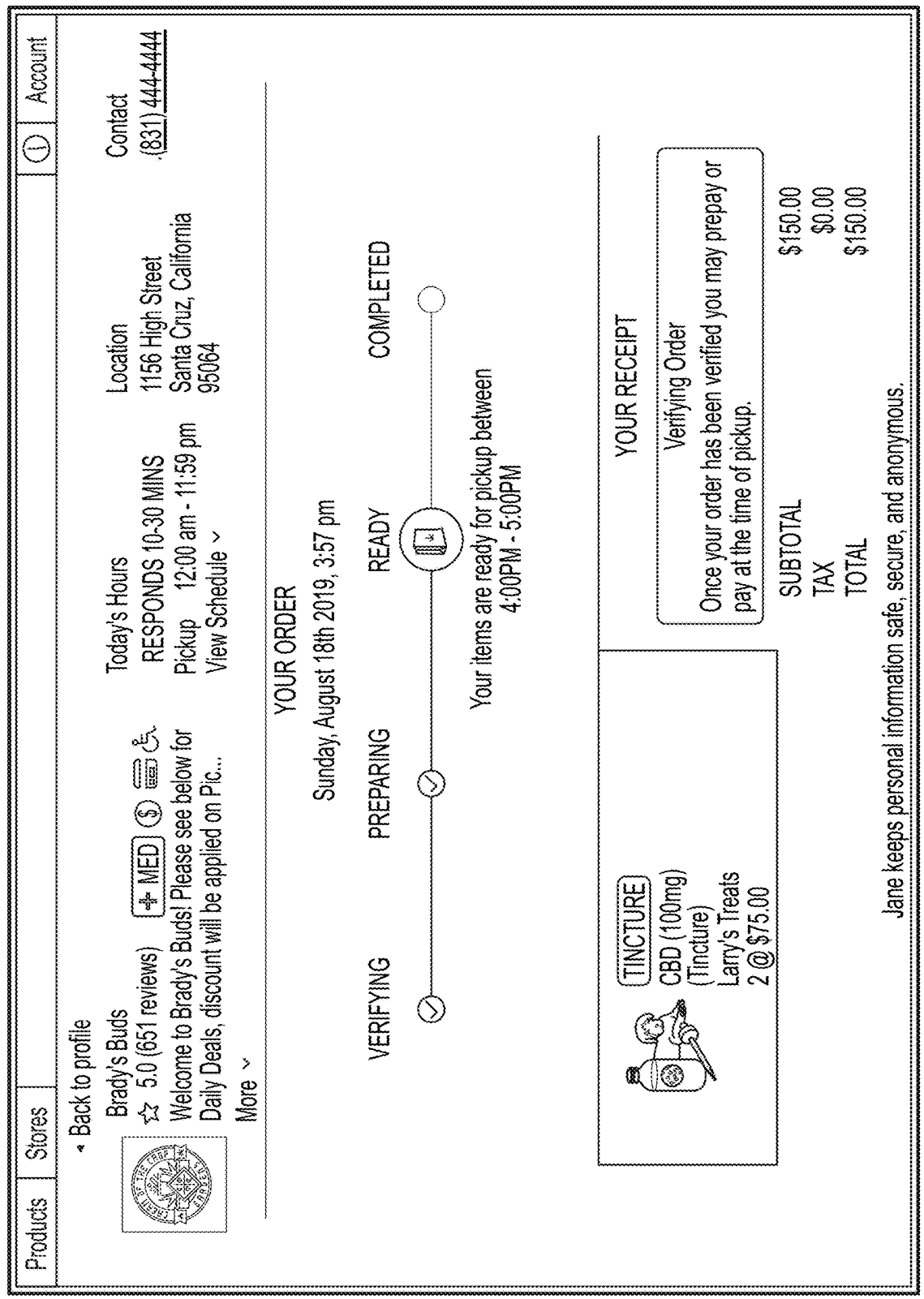
Figure 40:
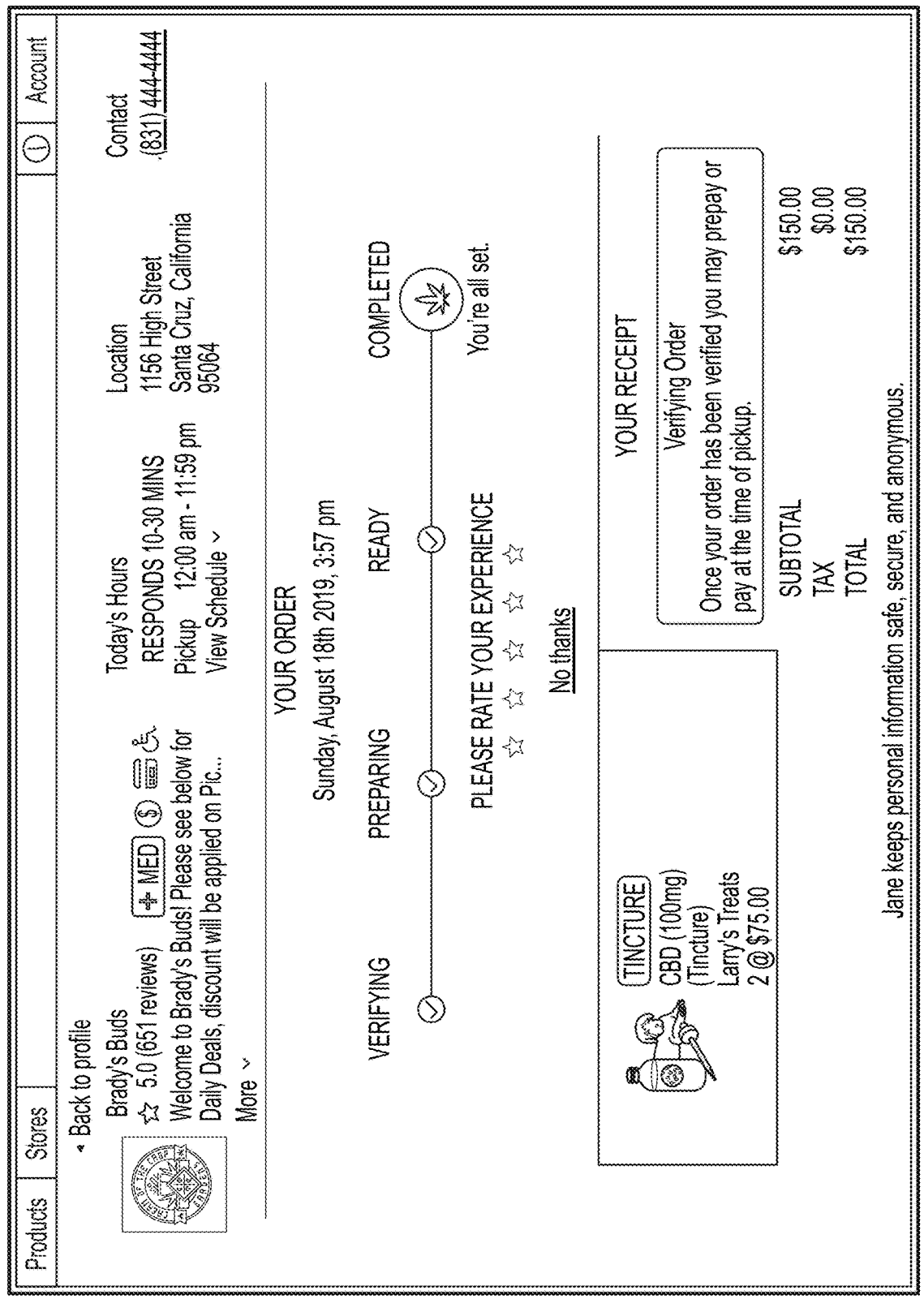

At any time, the customer can review his reservation history 3201 by clicking the account 3202 button as shown on the page of FIG. 32. Details about each reservation can be seen by the customer clicking on a link 3204, which leads to the page of FIG. 33, which illustrates the status of the order and the reason for the status. For example, the merchant may decide to decline a reservation associated with the purchase transaction. As shown in the page of FIG. 34 (which is part of the user interface of the merchant's fulfillment software, not part of the brand site), the merchant can provide a message and invoke a decline control 3402.

Figure 35:
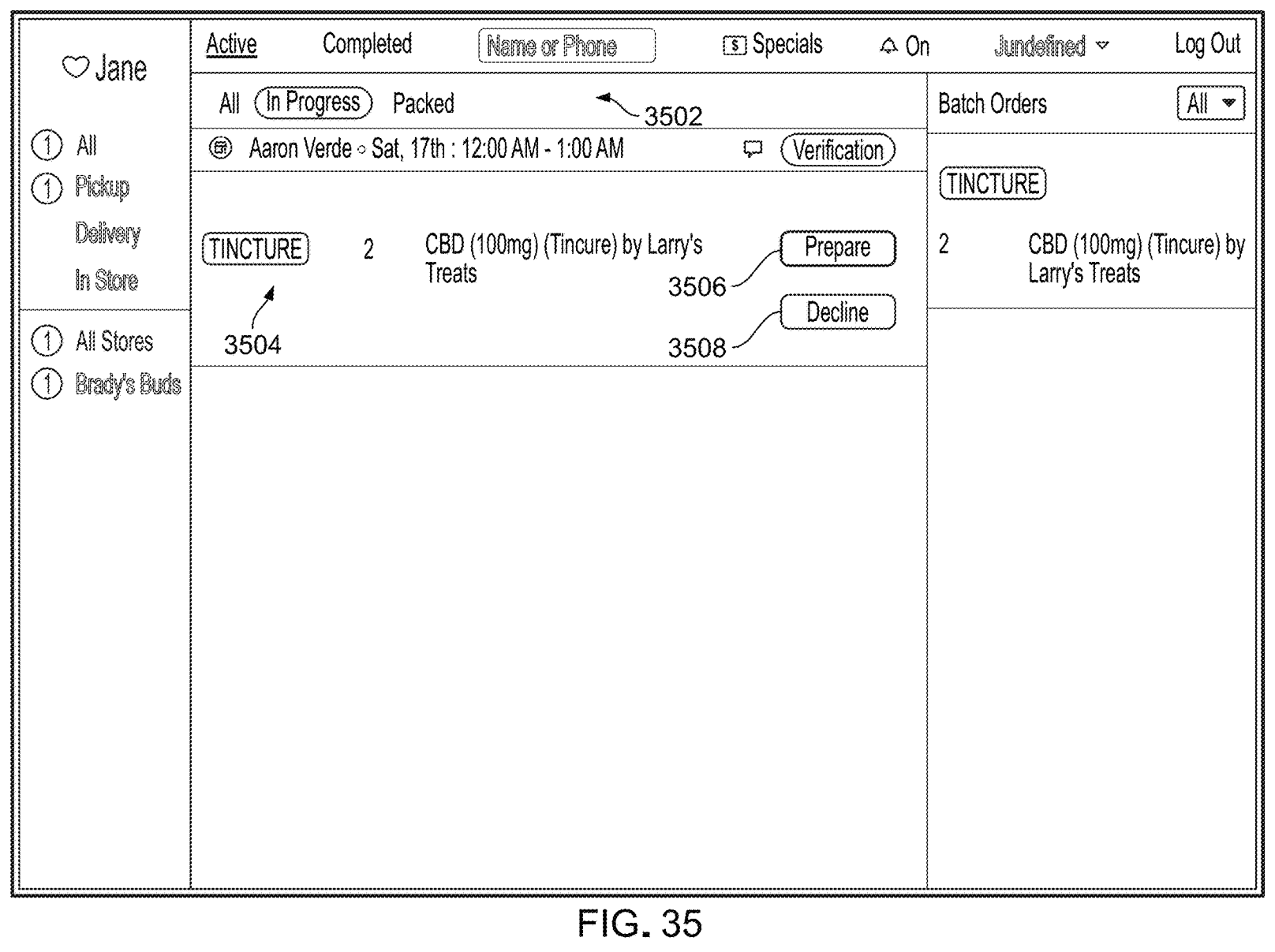
Figure 37:
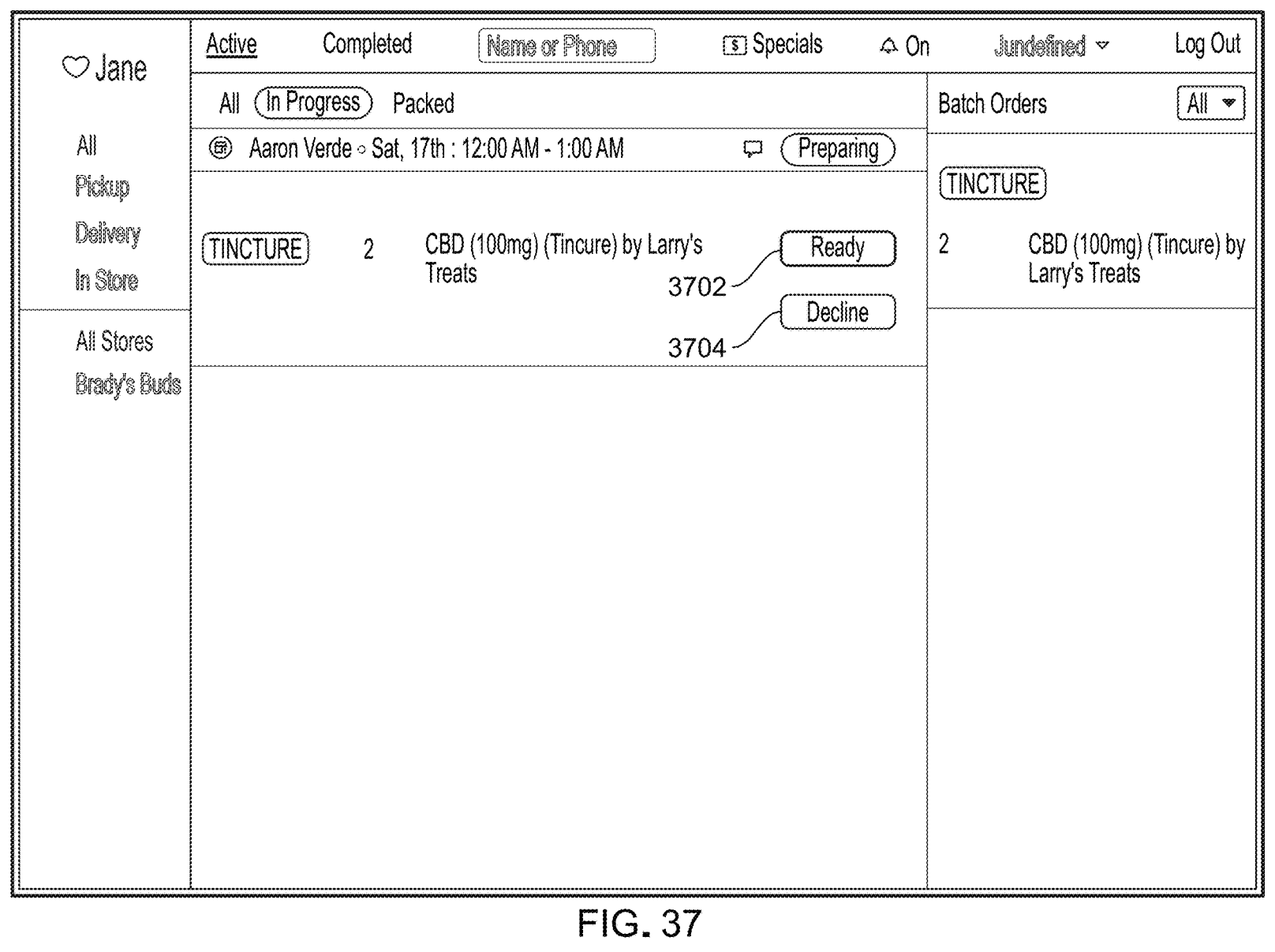
Figure 39:
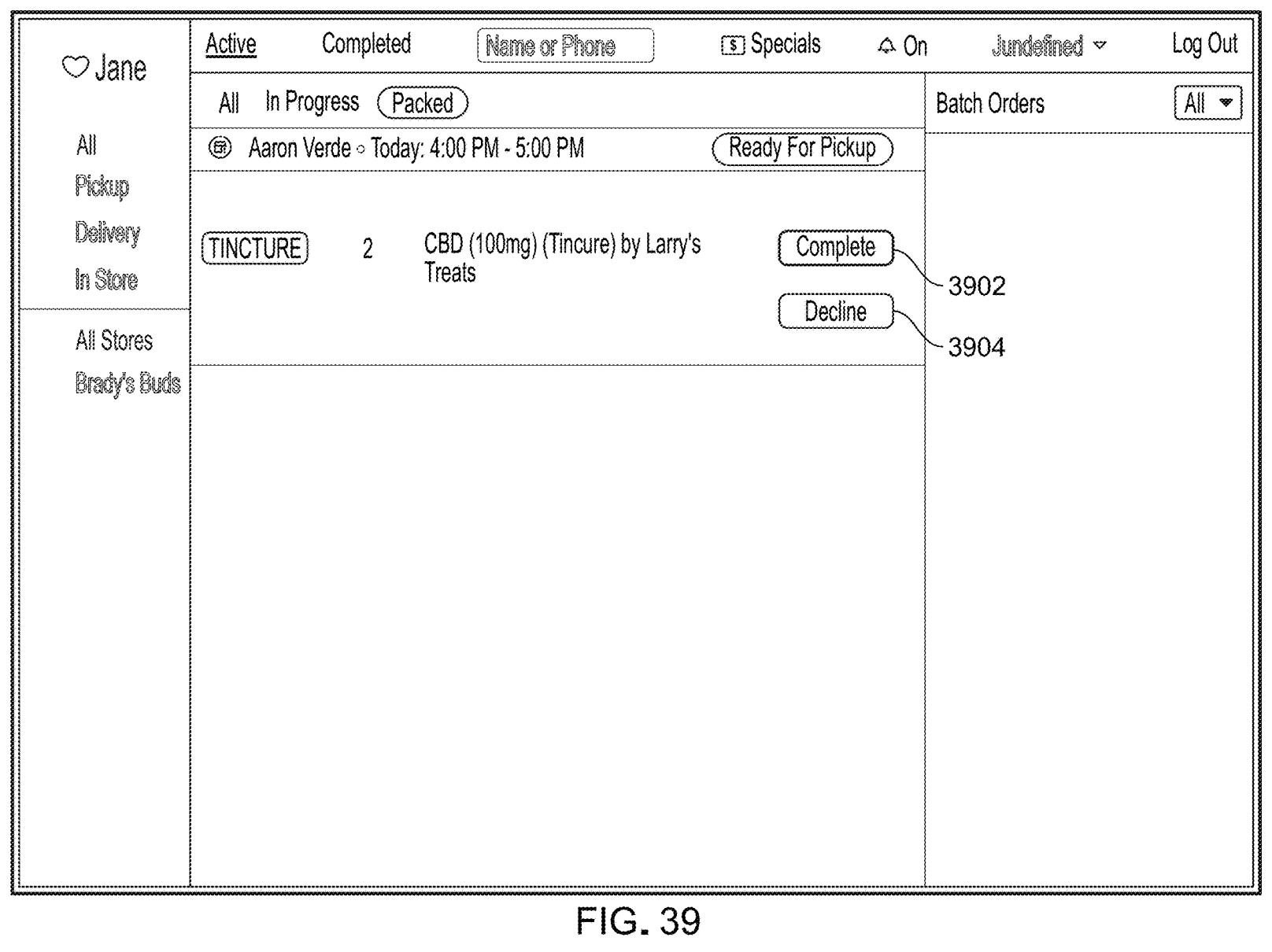

FIGS. 35 through 41 illustrate interaction between user interface pages of a merchant's fulfillment software and user interface pages presented on the brand site during the process of merchant fulfillment of a purchase transaction. The interaction between the pages of the merchant's fulfillment software and the user interface pages presented on the brand site can be managed by the platform. Also, the user interface pages of both the merchant's fulfillment software and the brand site can be managed and presented by the platform. In some implementations, FIGS. 35, 37, and 39 are pages presented by the platform through the merchant's fulfillment software to the merchant, while the pages of FIGS. 36, 38, 40, and 41 are pages presented by the platform through the brand site.

When a purchase transaction is ready for fulfillment, it must be verified and processed by the merchant. As shown in FIG. 35, the user interface page has tabs 3502 that enable the merchant to select whether to view all orders, orders for which fulfillment is in progress, and orders that are packed (that is fulfilled and ready for pickup). As shown on the page of FIG. 35, the merchant has selected in-progress orders, one of which is shown on the first line of the page 3504. Among other things, the merchant can invoke one of the other of two controls 3506 or 3508 indicating that the merchant will prepare the product for pickup or that the merchant will decline the reservation. If the merchant clicks on the prepare button, the platform then causes the page of FIG. 36 to appear on the brand site showing that the order is in preparation.

Once the product has been prepared, the page of FIG. 37 is presented to the merchant and enables the merchant either to indicate that the product is ready for pickup 3702 or, again, to decline the reservation 3704. If the merchant indicates that the product is ready, the platform uses that information to present the page of FIG. 38 to the customer through the brand site, indicating that the product is ready for pickup.

Figure 41:
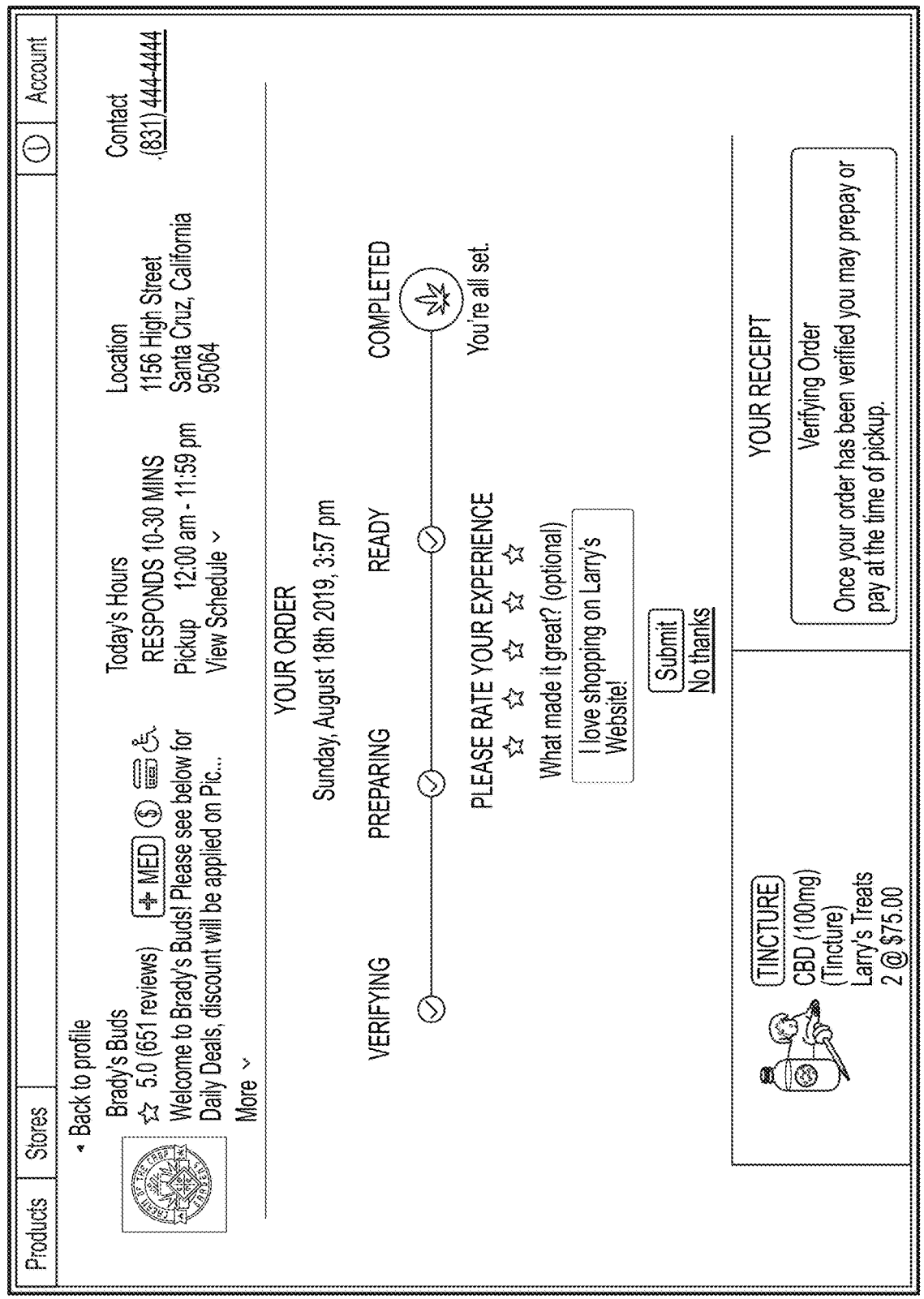

Once the product has been picked up, the merchant is presented with the page of FIG. 39 enabling the merchant to indicate either that the fulfillment of the purchase transaction is complete 3902 or, again, to decline the delivery 39. The platform then can update the brand site as shown on the page of FIG. 40 to advise the customer that the transaction has been fulfilled. As shown in FIG. 41, the customer has been given the chance to rate his experience in buying the product from the selected merchant.

Other implementations are also within the scope of the following claims.

The invention claimed is:
1. A computer-based method comprising
a central server operated by a platform host interacting in coordination with both (A) a brand server operated by or for a brand and configured to serve an online site of the brand, and (B) one or more retail servers operated by separate retail stores, with respect to products of the brand currently in stock at the retail stores, the central server, the brand server, and each of the retail servers being controlled by entities that are independent of one another, the coordinated interactions by the central server comprising
  (a) the central server receiving repeatedly in real time from the one or more retail servers over a communication network information about the identities and numbers of units of products of the brand currently in stock at corresponding retail stores,
  (b) the central server storing in a database (i) information about which retail stores have the products in stock, and (ii) the information about the identities and numbers of units of products of the brand in stock at the corresponding retail stores,

(c) based on and in coordination with the information stored in the database, the central server operated by the platform host causing a view to be embedded on the brand site, the view caused by the central server to be embedded on the brand site being configured to present (i) information about products of the brand, the products in stock at one or more retail stores, the information including prices of the products at the one or more retail stores, and (ii) comparative information about the retail stores, (d) the central server storing in the database information about transactions including quantities, prices, timing, and retail stores for the transactions, (e) the central server sending information about the transactions to the retail stores, (f) the causing of the view to be embedded comprising one or more of:
  (i) sending a widget to be embedded in the brand site, the widget configured to present user interface elements enabling navigating, sorting, filtering, and viewing available units of products and corresponding prices at the retail sites, the user interface elements comprising controls and graphical elements within native pages being served by the brand server, the controls and graphical elements being presented as part of the native pages,
  (ii) providing a feed of continuous, real-time HTML-based code to be embedded directly in pages of the brand site, and
  (iii) providing an embeddable web application code snippet to be placed in the brand site, (f) after the transactions have occurred, the central server sending to the brand, composite information derived from (a) information about the transactions stored in the database and indicative of products, quantities, prices, timing, and retail stores for the transactions, and (b) information about the identities and numbers of units of products of the brand in stock at the corresponding retail stores, while protecting against unauthorized access to private information of the retail stores.

2. The method of claim 1 in which the causing of the view to be embedded comprises exposing to the customers features of a transaction facility of the retail store.

3. The method of claim 1 in which the causing of the view to be embedded comprises the central server acting as an intermediary for the transaction between the customer and the retail store.

4. The method of claim 1 comprising the central server providing information resulting from the transaction to the retail store for use in fulfillment of the transaction.

5. The method of claim 4 in which the retail store has a physical presence at a location and the central server provides the information for use in fulfillment of the transaction from the location of the physical presence of the retail store.

6. The method of claim 1 comprising the central server receiving over a communication network information about customer activities on the brand site including activities during the transaction and other activities prior to or after the transaction.

7. The method of claim 6 comprising the central server storing the information about customer activities and sending the stored information through a communication network to the brand.

8. The method of claim 1 comprising the central server causing confirmation of the transaction to be provided.

9. The method of claim 1 comprising
receiving over a communication network at the central server, information about activities with respect to an identified product of the brand,
at the central server, correlating the information about the activities with information about units of the identified product of the brand currently in stock at one or more of the retail stores.

10. The method of claim 9 in which the receiving of the information about activities comprises receiving information about navigation of the brand site.

11. The method of claim 9 in which the receiving of the information about activities comprises receiving information about input to the brand site.

12. The method of claim 9 in which the receiving of the information about activities comprises receiving information about the identified product.

13. The method of claim 9 in which the receiving of the information about activities comprises receiving information about a transaction by the customer for the product at the retail stores.

14. The method of claim 13 in which the information about activities on the brand site comprises information representing at least one of an identity of the customer, reasons for the transaction, a context of the transaction, or a method in which the transaction was effected.

15. The method of claim 9 comprising the central server sending the information about activities of the customer on the brand site to the brand.

16. The method of claim 9 comprising the central server sending the information about activities of the customer on the brand site of the brand to the retail store.

17. The method of claim 9 comprising receiving over a communication network at the central server, information about purchase transactions at one or more of the merchants having physical presences at locations, the purchase transactions having been fulfilled from the locations.

18. The method of claim 1 comprising
receiving over a communication network at the central server from two or more competitor retail stores offering one or more of the products to customers, information about one or both of a current price and units of inventory of the product offered by each of the competitor retail stores, and
from the central server, providing the information about the current prices and units of inventory of the product offered by the two or more competitor retail stores through a communication network for presentation to the customers.

19. The method of claim 18 comprising storing the received information about one or both of the current prices and units of inventory of the one or more products in a central database, and providing the information for presentation to the customer using the information stored in the central database.

20. The method of claim 18 in which the providing of the information for presentation to the customers comprises providing the information through a communication network to the brand site.

21. The method of claim 20 in which the online site comprises a site of a brand or of another product portal.

22. The method of claim 20 in which the online site comprises a site of a merchant.

23. The method of claim 18 in which the providing of the information for presentation to the one or more customers comprises providing data representing an online marketplace for presentation to the one or more customers.

24. The method of claim 18 in which the providing of the information for presentation to the customer comprises providing the information in real time as the current prices or units of inventory of the retail stores change.

25. The method of claim 18 in which the receiving of the information of one or both of the current price and units of inventory of the one or more products comprises receiving the information from computer processes running at or in association with point of sale systems of the one or more competitor retail stores.

26. The method of claim 18 comprising from the central server, in conjunction with the presentation of the information about one or more of a current price or units of inventory, causing presentation to the one or more customers of user interface elements for the customer to engage in a purchase transaction with one of the merchants.

27. The method of claim 18 in which at least one of the retail stores has a physical presence, the transactions are for units of the one or more products in stock at locations of one or more of the retail stores, and the units of the one or more products are to be picked up by or delivered to the customers from the locations.

28. The method of claim 18 comprising receiving at the central server through a communication network from another server, an identification of a product determined to be of interest to one of the customers, and filtering the information provided for presentation to the customer based on the identification of the product.

* * * * *

UNITED STATES PATENT AND TRADEMARK OFFICE
CERTIFICATE OF CORRECTION

| | | Page 1 of 1 |
|---|---|---|
| PATENT NO. | : 11,010,811 B2 | |
| APPLICATION NO. | : 16/589363 | |
| DATED | : May 18, 2021 | |
| INVENTOR(S) | : Socrates Munaf Rosenfeld et al. | |

It is certified that error appears in the above-identified patent and that said Letters Patent is hereby corrected as shown below:

In the Claims

Column 27, Line 33, in Claim 1, delete "(f)" and insert -- (g) --, therefor.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*